(12) United States Patent
Yokoyama et al.

(10) Patent No.: US 12,403,548 B2
(45) Date of Patent: Sep. 2, 2025

(54) LASER PROCESSING APPARATUS AND LASER PROCESSING METHOD

(71) Applicant: Panasonic Intellectual Property Management Co., Ltd., Osaka (JP)

(72) Inventors: Jun Yokoyama, Osaka (JP); Takashi Urashima, Osaka (JP); Yohei Takechi, Osaka (JP)

(73) Assignee: PANASONIC INTELLECTUAL PROPERTY MANAGEMENT CO., LTD., Osaka (JP)

(*) Notice: Subject to any disclaimer, the term of this patent is extended or adjusted under 35 U.S.C. 154(b) by 1030 days.

(21) Appl. No.: 17/378,815

(22) Filed: Jul. 19, 2021

(65) Prior Publication Data

US 2022/0055147 A1 Feb. 24, 2022

(30) Foreign Application Priority Data

Aug. 19, 2020 (JP) .................. 2020-138677
Aug. 24, 2020 (JP) .................. 2020-140886

(51) Int. Cl.
*B23K 26/03* (2006.01)
*B23K 26/082* (2014.01)
(Continued)

(52) U.S. Cl.
CPC .......... *B23K 26/032* (2013.01); *B23K 26/082* (2015.10); *G01B 11/002* (2013.01);
(Continued)

(58) Field of Classification Search
CPC .. B23K 26/032; B23K 26/082; G01B 11/002; G02B 19/0014; G02B 19/009; G02B 26/0816; G02B 26/105
(Continued)

(56) References Cited

U.S. PATENT DOCUMENTS

| | | | | | |
|---|---|---|---|---|---|
| 4,532,402 A | * | 7/1985 | Overbeck | ............ | G02B 26/101 219/121.79 |
| 5,045,679 A | * | 9/1991 | Suzuki | ................ | B23K 26/043 430/327 |

(Continued)

FOREIGN PATENT DOCUMENTS

| | | |
|---|---|---|
| CA | 2925039 | 3/2015 |
| DE | 102015012565 B3 | 10/2016 |

(Continued)

*Primary Examiner* — Jimmy Chou
(74) *Attorney, Agent, or Firm* — Rimon P.C.

(57) ABSTRACT

A laser processing apparatus includes a laser oscillator that oscillates processing laser light to be incident on a processing point on a processing surface of a workpiece, a coupling mirror that deflects or transmits the processing laser light and measurement light to be incident on the processing point toward the processing point, a measurement light deflection unit that changes an incident angle of the measurement light on the coupling mirror, a lens that concentrates the processing laser light and the measurement light on the processing point, a controller that controls the laser oscillator and the measurement light deflection unit, a measurement processor that measures a depth of a keyhole generated at the processing point by the processing laser light by using an optical interference signal based on an interference generated by an optical path difference between the measurement light reflected at the processing point and reference light, and a beam position measurement unit that measures positions of the processing laser light and the measurement light.

15 Claims, 24 Drawing Sheets

(51) Int. Cl.
  *G01B 11/00* (2006.01)
  *G02B 19/00* (2006.01)
  *G02B 26/08* (2006.01)
  *G02B 26/10* (2006.01)

(52) U.S. Cl.
  CPC ....... *G02B 19/0014* (2013.01); *G02B 19/009* (2013.01); *G02B 26/0816* (2013.01); *G02B 26/105* (2013.01)

(58) Field of Classification Search
  USPC .................................................. 219/121.85
  See application file for complete search history.

(56) References Cited

U.S. PATENT DOCUMENTS

| | | | | |
|---|---|---|---|---|
| 5,227,910 A * | 7/1993 | Khattak | ............... | G02B 26/108 359/209.1 |
| 5,463,202 A * | 10/1995 | Kurosawa | ............... | B23K 26/04 372/29.014 |
| 5,763,853 A * | 6/1998 | Shimomura | ......... | B23K 26/032 219/121.72 |
| 5,864,114 A * | 1/1999 | Fukuda | ............... | B23K 26/032 219/121.69 |
| 5,910,260 A * | 6/1999 | Gerber | ................ | B23K 26/082 219/121.72 |
| 6,163,010 A * | 12/2000 | Kobsa | ................ | B23K 26/0648 219/121.84 |
| 6,215,094 B1 * | 4/2001 | Dausinger | ............... | B23K 26/40 219/121.62 |
| 6,791,057 B1 * | 9/2004 | Kratzsch | ................ | B23K 26/24 219/121.62 |
| 7,577,285 B2 * | 8/2009 | Schwarz | ............... | B23K 9/0956 348/90 |
| 7,989,730 B2 * | 8/2011 | Regaard | ................ | B23K 26/04 219/121.63 |
| 8,822,875 B2 * | 9/2014 | Webster | ............... | G01B 9/0203 219/121.13 |
| 9,757,817 B2 * | 9/2017 | Webster | ............ | G01B 9/02091 |
| 9,802,271 B2 * | 10/2017 | Stork Genannt Wersborg | | B23K 26/042 |
| 10,578,428 B2 * | 3/2020 | Strebel | ............... | G01B 9/02091 |
| 10,967,452 B2 * | 4/2021 | Moser | ............... | B23K 15/0013 |
| 11,511,370 B2 * | 11/2022 | Sakurai | ................ | G01B 11/02 |
| 11,964,339 B2 * | 4/2024 | Sakai | ............... | B23K 26/064 |
| 11,999,008 B2 * | 6/2024 | Sakai | ............... | B23K 31/125 |
| 12,053,840 B2 * | 8/2024 | Regaard | ............... | B23K 31/125 |
| 2004/0007563 A1 * | 1/2004 | Hastings | ............ | B23K 26/0648 219/121.69 |
| 2004/0251243 A1 * | 12/2004 | Lizotte | ............... | B23K 26/0676 219/121.73 |
| 2008/0217312 A1 * | 9/2008 | Tokura | ................ | B81C 1/00896 219/121.72 |
| 2012/0074105 A1 * | 3/2012 | Okamoto | ............. | B23K 26/146 219/121.72 |
| 2012/0285936 A1 * | 11/2012 | Urashima | ......... | G01B 9/02091 219/121.63 |
| 2012/0318775 A1 * | 12/2012 | Schwarz | ............. | B23K 26/032 356/606 |
| 2013/0120740 A1 * | 5/2013 | Schonleber | ........ | G01B 9/02063 356/72 |
| 2013/0175243 A1 * | 7/2013 | Wang | ................... | B23K 26/382 219/121.7 |
| 2014/0144895 A1 * | 5/2014 | Stork Genannt Wersborg | ............ | B23K 26/042 219/121.75 |
| 2014/0153085 A1 | 6/2014 | Dobbie | | |
| 2014/0268145 A1 * | 9/2014 | Lane | ...................... | G01B 11/04 356/627 |
| 2015/0014889 A1 * | 1/2015 | Goya | ................. | B23K 26/0652 219/121.72 |
| 2015/0076125 A1 * | 3/2015 | Toyosawa | .............. | B23K 26/08 219/121.79 |
| 2015/0352666 A1 * | 12/2015 | Fujita | .................... | B23K 26/046 219/121.61 |
| 2016/0008920 A1 * | 1/2016 | Goya | ..................... | B23K 26/36 219/121.61 |
| 2016/0039045 A1 * | 2/2016 | Webster | ............. | G01B 9/02091 356/450 |
| 2016/0059347 A1 * | 3/2016 | Kogel-Hollacher | ........................ B23K 26/082 219/121.73 |
| 2016/0059350 A1 * | 3/2016 | Schoenleber | .......... | B23K 26/04 219/121.81 |
| 2016/0114434 A1 * | 4/2016 | Regaard | ............... | B23K 26/046 219/121.81 |
| 2016/0193692 A1 * | 7/2016 | Regaard | ............... | B23K 31/125 219/121.62 |
| 2016/0202045 A1 * | 7/2016 | Schönleber | .......... | B23K 26/046 356/497 |
| 2017/0282293 A1 * | 10/2017 | Miyata | ................ | B23K 26/048 |
| 2017/0326669 A1 * | 11/2017 | Moser | ............... | B23K 15/0013 |
| 2019/0041196 A1 * | 2/2019 | Strebel | ................ | G01B 11/22 |
| 2019/0091798 A1 * | 3/2019 | Schönleber | ............ | B23K 26/21 |
| 2019/0143458 A1 * | 5/2019 | Strebel | ................. | B23K 26/032 219/121.64 |
| 2019/0299331 A1 * | 10/2019 | Moser | ................... | B23K 26/064 |
| 2020/0023461 A1 * | 1/2020 | Galbraith | ............. | B23K 26/032 |
| 2020/0033452 A1 * | 1/2020 | Takagawa | .......... | G02B 26/0816 |
| 2020/0038954 A1 * | 2/2020 | Regulin | ............... | B23K 26/147 |
| 2020/0041249 A1 * | 2/2020 | Strebel | ................ | B23K 26/032 |
| 2020/0055141 A1 * | 2/2020 | Schürmann | ........... | B23K 26/048 |
| 2020/0055142 A1 * | 2/2020 | Schürmann | ............ | B23K 26/21 |
| 2020/0198049 A1 * | 6/2020 | Yokoyama | ........... | B23K 31/003 |
| 2020/0198051 A1 * | 6/2020 | Sauer | ................ | B23K 26/042 |
| 2020/0361038 A1 * | 11/2020 | Takechi | ................. | B23K 26/50 |
| 2020/0376591 A1 * | 12/2020 | Sakai | ..................... | G01B 11/22 |
| 2021/0031298 A1 * | 2/2021 | Sakai | ...................... | G01B 9/02 |
| 2021/0053149 A1 * | 2/2021 | Takechi | ............. | B23K 26/0665 |
| 2021/0060695 A1 * | 3/2021 | Yokoyama | ............. | B23K 26/21 |
| 2021/0323088 A1 * | 10/2021 | Yokoyama | ........... | B23K 26/032 |
| 2022/0290973 A1 * | 9/2022 | Stambke | ............... | B23K 26/082 |

FOREIGN PATENT DOCUMENTS

| | | |
|---|---|---|
| JP | 7-276069 | 10/1995 |
| JP | 2002-035981 A | 2/2002 |
| JP | 2002-509032 A | 3/2002 |
| JP | 2006-015373 A | 1/2006 |
| JP | 2013-501964 | 1/2013 |
| JP | 2016-538134 | 12/2016 |
| JP | 2019-534788 | 12/2019 |
| WO | 2011/059536 | 5/2011 |
| WO | 2012/173008 | 12/2012 |

* cited by examiner

FIG. 5
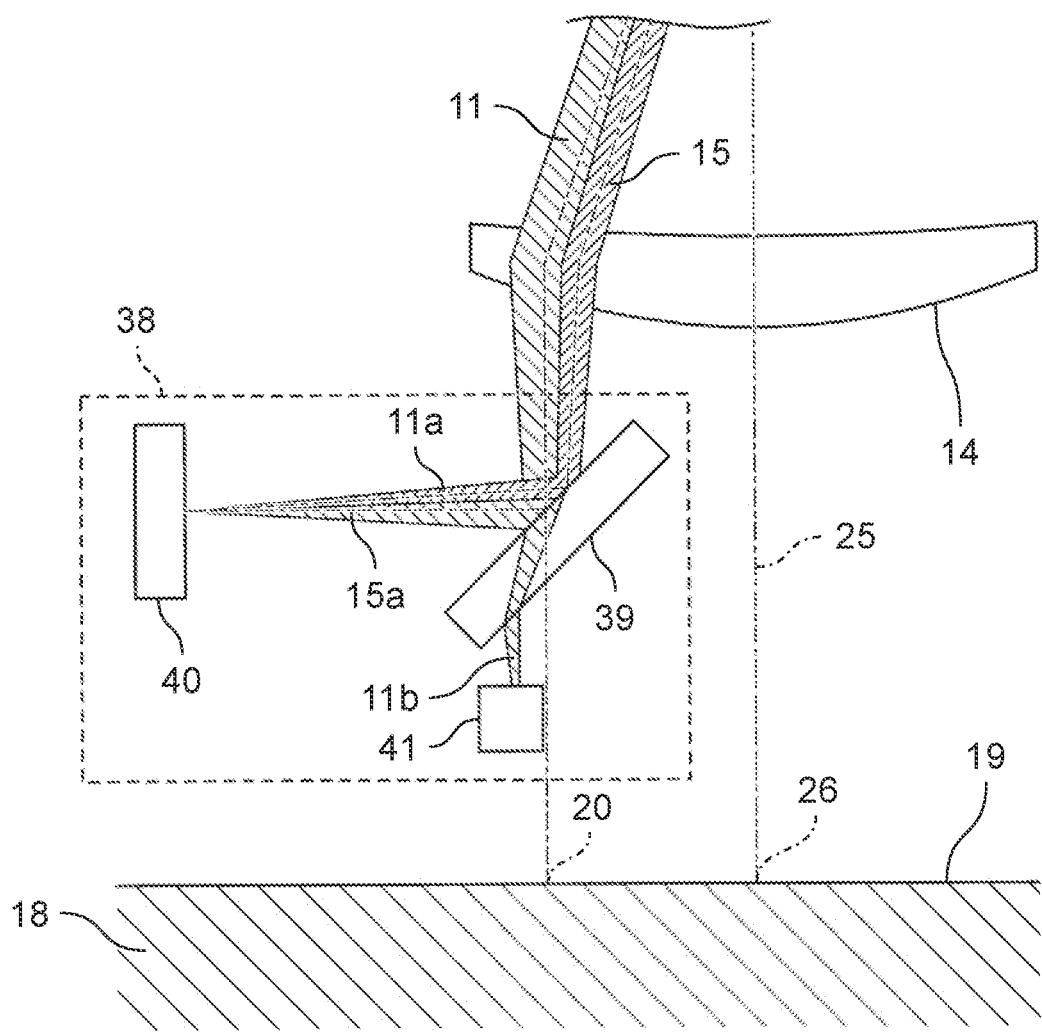
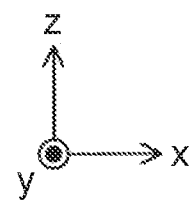

FIG. 9

| Data number k | Laser output data $L_k$ | Processing point position $x_k$ | Processing point position $y_k$ | Scan angle $\varphi x_k$ | Scan angle $\varphi y_k$ | Correction amount $\psi x_k$ | Correction amount $\psi y_k$ |
|---|---|---|---|---|---|---|---|
| 0 | $L_0$ | $x_0$ | $y_0$ | $\varphi x_0$ | $\varphi y_0$ | $\psi x_0$ | $\psi y_0$ |
| 1 | $L_1$ | $x_1$ | $y_1$ | $\varphi x_1$ | $\varphi y_1$ | $\psi x_1$ | $\psi y_1$ |
| 2 | $L_2$ | $x_2$ | $y_2$ | $\varphi x_2$ | $\varphi y_2$ | $\psi x_2$ | $\psi y_2$ |
| ⋮ | | | | | | | |
| k-1 | $L_{k-1}$ | $x_{k-1}$ | $y_{k-1}$ | $\varphi x_{k-1}$ | $\varphi y_{k-1}$ | $\psi x_{k-1}$ | $\psi y_{k-1}$ |
| k | $L_k$ | $x_k$ | $y_k$ | $\varphi x_k$ | $\varphi y_k$ | $\psi x_k$ | $\psi y_k$ |
| k+1 | $L_{k+1}$ | $x_{k+1}$ | $y_{k+1}$ | $\varphi x_{k+1}$ | $\varphi y_{k+1}$ | $\psi x_{k+1}$ | $\psi y_{k+1}$ |
| ⋮ | | | | | | | |

LASER PROCESSING APPARATUS AND LASER PROCESSING METHOD

BACKGROUND

1. Technical Field

The present disclosure relates to a laser processing apparatus and a laser processing method.

2. Description of the Related Art

Published Japanese Translation No. 2013-501964 of the PCT International Publication discloses a laser processing apparatus. The laser processing apparatus measures a depth of a keyhole generated during metal processing by laser light by using an optical coherence tomography (OCT) technology that visualizes an internal structure of a sample by using an optical interferometer. The depth of the keyhole can be obtained based on an interference signal according to an optical path difference between measurement light (reflection light) reflected from a bottom surface of the keyhole and light (reference light) on a reference arm side.

SUMMARY

A laser processing apparatus according to one aspect of the present disclosure includes a laser oscillator that oscillates processing laser light to be incident on a processing point on a processing surface of a workpiece, a coupling mirror that deflects or transmits the processing laser light and measurement light to be incident on the processing point toward the processing point, a measurement light deflection unit that changes an incident angle of the measurement light on the coupling mirror, a lens that concentrates the processing laser light and the measurement light on the processing point, a controller that controls the laser oscillator and the measurement light deflection unit, a measurement processor that measures a depth of a keyhole generated at the processing point by the processing laser light by using an optical interference signal based on an interference generated by an optical path difference between the measurement light reflected at the processing point and reference light, and a beam position measurement unit that measures positions of the processing laser light and the measurement light.

A laser processing method according to one aspect of the present disclosure is performed by a laser processing apparatus including a laser light emitting unit that emits laser light to a workpiece and a measurement light emitting unit that emits measurement light for measuring an irradiation position of the laser light on the workpiece, and includes matching the irradiation position of the laser light and an irradiation position of the measurement light on the workpiece each other.

BRIEF DESCRIPTION OF THE DRAWINGS

FIG. 5 is a view illustrating a configuration example of a beam position measurement unit used for calculating a correction amount at a processing light grid point;

FIG. 9 is a diagram illustrating an example of data items included in corrected processing data;

DETAILED DESCRIPTIONS

Figure 1:
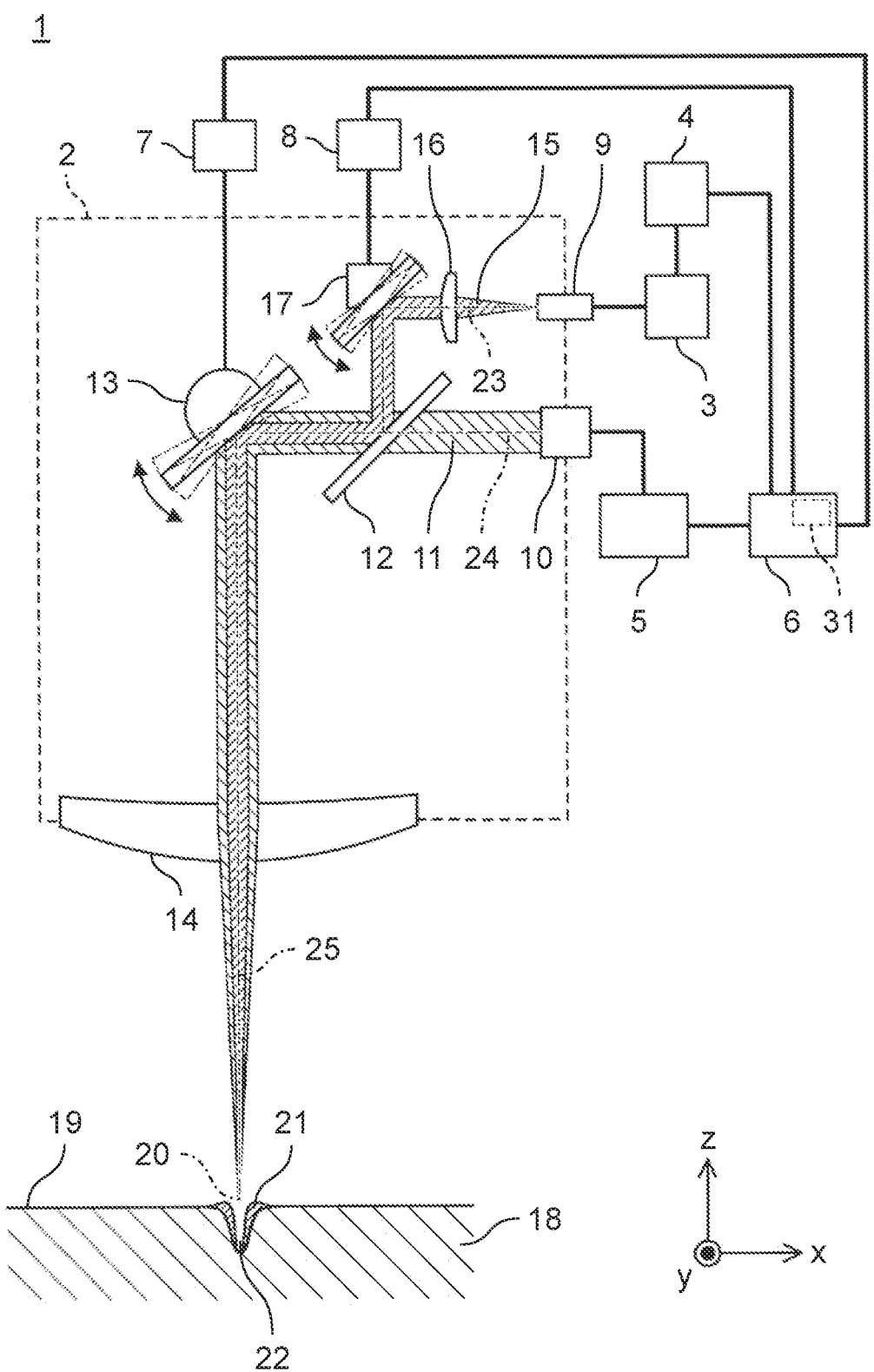
FIG. 1 is a view schematically illustrating a configuration of a laser processing apparatus according to a first exemplary embodiment of the present disclosure.

Preferred exemplary embodiments of the present disclosure will be described in detail below with reference to the accompanying drawings. In the present specification and the drawings, components having substantially the same functions are designated by the same reference numerals, and thus, redundant descriptions thereof are omitted. In FIG. 1 and subsequent figures, an x-axis direction, a y-axis direction, and a z-axis direction respectively represent a direction parallel to an x-axis, a direction parallel to a y-axis, and a direction parallel to a z-axis. The x-axis direction and the y-axis direction are orthogonal to each other. The x-axis direction and the z-axis direction are orthogonal to each other. The y-axis direction and the z-axis direction are orthogonal to each other. An xy plane represents a virtual plane parallel to the x-axis direction and the y-axis direction. An xz plane represents a virtual plane parallel to the x-axis direction and the z-axis direction. A yz plane represents a virtual plane parallel to the y-axis direction and the z-axis direction. Further, in the x-axis direction in FIG. 1 and subsequent figures, a direction indicated by an arrow is assumed to be a positive x-axis direction, and an opposite direction thereof is assumed to be a negative x-axis direction. Further, in the y-axis direction in FIG. 1 and subsequent figures, a direction indicated by an arrow is assumed to be a positive y-axis direction, and an opposite direction thereof is assumed to be a negative y-axis direction. Further, in the z-axis direction in FIG. 1 and subsequent figures, a direction indicated by an arrow is assumed to be a positive z-axis direction, and an opposite direction thereof is assumed to be a negative z-axis direction. The z-axis direction is the same in, for example, a vertical direction or an up-and-down direction, and the x-axis direction and the y-axis direction are the same in, for example, a horizontal direction or a left-to-right direction.

First Exemplary Embodiment

Recently, a laser processing apparatus in which a galvano mirror is combined with an fθ lens has been known. The galvano mirror can finely control a direction in which laser light is reflected. The fθ lens concentrates laser light on a processing point on a surface of a workpiece. However, when the method of measuring a depth of a keyhole disclosed in Japanese Patent Application No. 2013-501964 is applied to a laser processing apparatus in which a galvano mirror is combined with an fθ lens, there are following problems. That is, since wavelengths of processing laser light and measurement light are different from each other and the fθ lens has characteristics of causing chromatic aberration, there are problems that the processing laser light and the measurement light deviate from each other on a surface of a workpiece and a depth of a keyhole cannot be accurately measured.

An object of one aspect of the present disclosure is to provide a laser processing apparatus and a laser processing method capable of accurately measuring a depth of a keyhole.

Non-limiting examples of the present disclosure contribute to a provision of a laser processing apparatus and a laser processing method capable of accurately measuring a depth of a keyhole.

A laser processing apparatus according to one example of the present disclosure includes a laser oscillator that oscillates processing laser light to be incident on a processing point on a processing surface of a workpiece, a coupling mirror that deflects or transmits the processing laser light and measurement light to be incident on the processing point toward the processing point, a measurement light deflection unit that changes an incident angle of the measurement light on the coupling mirror, a lens that concentrates the processing laser light and the measurement light on the processing point, a controller that controls the laser oscillator and the measurement light deflection unit, a measurement processor that measures a depth of a keyhole generated at the processing point by the processing laser light by using an optical interference signal based on an interference generated by an optical path difference between the measurement light reflected at the processing point and reference light, and a beam position measurement unit that measures positions of the processing laser light and the measurement light.

A laser processing method according to one example of the present disclosure is a laser processing method performed by a laser processing apparatus which includes a first mirror that changes travel directions of processing laser light and measurement light, a measurement light deflection unit that changes an incident angle of the measurement light on the first mirror, a lens that concentrates the processing laser light and the measurement light on a processing point of a processing surface of a workpiece, and measures a depth of a keyhole generated at the processing point by applying the processing laser light thereto, and the method includes setting a target position on the processing surface, setting a first instruction value indicating an operation amount of the first mirror by which the processing laser light reaches the target position, obtaining a second instruction value indicating an operation amount of the measurement light deflection unit based on positions of the processing laser light and the measurement light measured by a beam position measurement unit for measuring the positions of the processing laser light and the measurement light, and controlling the laser oscillator for oscillating the processing laser light, the first mirror, and the measurement light deflection unit based on processing data including the first instruction value and the second instruction value.

According to one example of the present disclosure, a laser processing apparatus and a laser processing method capable of accurately measuring a depth of a keyhole can be constructed.

Further advantages and effects of one example of the present disclosure will be apparent from the specification and drawings. Such advantages and/or effects are respectively provided by some exemplary embodiments and characteristics described in the specification and drawings, but not all need to be provided in order to obtain one or more identical characteristics.

Processing data may include a first instruction value indicating an operation amount of a first mirror and a second instruction value indicating an operation amount of a measurement light deflection unit. A beam position measurement unit may include a position measurement mirror that reflects processing laser light and measurement light passing through a lens, and a two-dimensional imaging element that measures positions of the processing laser light and the measurement light reflected by the position measurement mirror. A controller sets a target position on a processing surface, sets the first instruction value to a target position at which the processing laser light reaches, and calculates the second instruction value based on positions of the processing laser light and the measurement light measured by the two-dimensional imaging element.

The position measurement mirror may be set to a reflectance of a wavelength of the processing laser light that becomes power by which the processing laser light can be incident on the two-dimensional imaging element. The two-dimensional imaging element may be installed at a position where an optical path length of the two-dimensional imaging element from a lens matches an optical path length of a processing point from the lens.

The position measurement mirror may be configured by a plurality of mirrors.

The position measurement mirror may have a reflectance of a wavelength of the processing laser light, which is 0.1% or less.

The controller may set a grid shape pattern on a processing surface and set a grid point of the grid shape pattern at a target position.

Structure of Laser Processing Apparatus 1

A configuration of laser processing apparatus 1 according to a first exemplary embodiment of the present disclosure will be described with reference to FIG. 1. FIG. 1 is a view schematically illustrating the configuration of laser processing apparatus 1 according to the first exemplary embodiment of the present disclosure.

Laser processing apparatus 1 includes processing head 2, optical interferometer 3, measurement processor 4, laser oscillator 5, controller 6, first driver 7, and second driver 8.

Optical interferometer 3 emits measurement light 15 for OCT measurement. Measurement light 15 emitted from optical interferometer 3 is input to processing head 2 via measurement light inlet 9. Measurement light inlet 9 is installed on measurement light deflection unit 17. Measurement light inlet 9 is installed, on processing head 2, at a position where measurement light 15 can be introduced into measurement light deflection unit 17.

Laser oscillator 5 oscillates processing laser light 11 for laser processing. Processing laser light 11 oscillated by laser oscillator 5 is input to processing head 2 via processing light inlet 10.

Processing laser light 11 input to processing head 2 transmits through dichroic mirror 12, is reflected by first mirror 13, transmits through lens 14, and is concentrated on processing surface 19 which is a surface of workpiece 18.

Thereby, processing point 20 of workpiece 18 is laser-processed. At this time, processing point 20 to which processing laser light 11 is applied melts, and thereby, molten pool 21 is formed in workpiece 18.

Further, a molten metal evaporates from molten pool 21, and keyhole 22 is formed in workpiece 18 due to a pressure of steam generated at the time of evaporation.

Measurement light 15 input from measurement light inlet 9 to processing head 2 is converted into parallel light by collimating lens 16 and is reflected by measurement light deflection unit 17. Thereafter, measurement light 15 is reflected by dichroic mirror 12, is reflected by first mirror 13, transmits through lens 14, and is concentrated on processing point 20 on processing surface 19 of workpiece 18. Dichroic mirror 12 is a coupling mirror that couples measurement light 15 to processing laser light 11.

Measurement light 15 is reflected by a bottom surface of keyhole 22 and reaches optical interferometer 3 by traveling back along a propagation path. Optical interferometer 3 generates an optical interference signal due to an optical interference between input measurement light 15 and reference light (not illustrated). The reference light is light applied to a reference mirror (not illustrated) which is a reference surface, in the light emitted from a light source (not illustrated) of optical interferometer 3.

Measurement processor 4 measures a depth of keyhole 22, that is, a penetration depth of processing point 20, based on the optical interference signal. The penetration depth means a distance between the highest point of a melted portion of workpiece 18 and processing surface 19.

A wavelength (first wavelength) of processing laser light 11 is different from a wavelength (second wavelength) of measurement light 15. Dichroic mirror 12 has characteristics of transmitting light of the first wavelength therethrough and reflecting light of the second wavelength.

For example, when a YAG laser or a fiber laser is used as processing laser light 11, a wavelength of processing laser light 11 is 1064 nm. Further, for example, when an OCT light source is used as measurement light 15, a wavelength of measurement light 15 is 1300 nm.

First mirror 13 and measurement light deflection unit 17 are movable mirrors that can perform a rotational operation in two or more axes. First mirror 13 and measurement light deflection unit 17 are, for example, galvano mirrors.

First mirror 13 is connected to controller 6 via first driver 7. Measurement light deflection unit 17 is connected to controller 6 via second driver 8.

First driver 7 operates first mirror 13 based on an instruction from controller 6. Second driver 8 operates measurement light deflection unit 17 based on an instruction from controller 6.

Controller 6 includes memory 31. Memory 31 stores processing data for performing desirable processing for workpiece 18 and correction number table data. Details of the correction number table data will be described below.

FIG. 1 illustrates that each of first mirror 13 and measurement light deflection unit 17 performs only a rotational operation about a rotation axis extending in the y-axis direction as an example. The rotational operation is represented by a dashed rectangle line and both arrow lines in the figure.

Each of first mirror 13 and measurement light deflection unit 17 can be configured to perform a rotational operation in two or more axes. With this configuration, each of first mirror 13 and measurement light deflection unit 17 can also perform, for example, a rotational operation about a rotation axis extending in the x-axis direction.

Hereinafter, for the sake of simple description, a case where each of first mirror 13 and measurement light deflection unit 17 performs a rotational operation about a rotation axis extending in the y-axis direction will be described.

When measurement light deflection unit 17 is in an original position, measurement optical axis 23 of measurement light 15 matches processing optical axis 24 of processing laser light 11 after being reflected by dichroic mirror 12.

Further, when first mirror 13 is at the original position, processing optical axis 24 of processing laser light 11 matches lens optical axis 25 which is the center of lens 14 when transmitting through lens 14 after being reflected by first mirror 13.

In the following description, a position (may be referred to as an irradiation position) in which processing laser light 11 and measurement light 15 transmitting through the center of lens 14 reach processing surface 19 of workpiece 18 is referred to as "processing original point 26" (see FIG. 2).

The original positions of each of first mirror 13 and measurement light deflection unit 17 are the same as positions in which processing laser light 11 and measurement light 15 transmit through the center of lens 14.

Lens 14 concentrates processing laser light 11 and measurement light 15 on processing point 20. Lens 14 is, for example, an fθ lens.

First mirror 13 and lens 14 configure a general optical scan system including a galvano mirror and an fθ lens.

Therefore, an arrival position of processing laser light 11 on processing surface 19 can be controlled by rotating first mirror 13 from the original position by a predetermined angle.

Hereinafter, the angle at which first mirror 13 is rotated from the original position is referred to as an "operation amount of first mirror 13".

The operation amount of first mirror 13 for applying processing laser light 11 to desirable processing point 20 can be set uniquely when a positional relationship of each optical member configuring processing head 2 and a distance from lens 14 to processing surface 19 are determined.

The distance from lens 14 to processing surface 19 is preferably set to a distance at which a focal position where processing laser light 11 is most concentrated and processing surface 19 match each other such that processing performed by processing laser light 11 is performed most efficiently. However, the distance from lens 14 to processing surface 19 is not limited thereto and may be determined to be any distance according to a processing utility.

By changing the operation amount of first mirror 13 according to a predetermined operation schedule, the position of processing point 20 can be scanned on processing surface 19.

Further, by performing switching of on and off of laser oscillator 5 under the control of controller 6, any position on processing surface 19 can be laser-processed in any pattern in a scannable range of processing laser light 11.

Influence of Chromatic Aberration

Next, an influence of chromatic aberration will be described with reference to FIG. 2. FIG. 2 is a view schematically illustrating laser processing apparatus 1 in a state where first mirror 13 is operated from an original position. In FIG. 2, measurement light deflection unit 17 is assumed to be at the original position.

Figure 2:
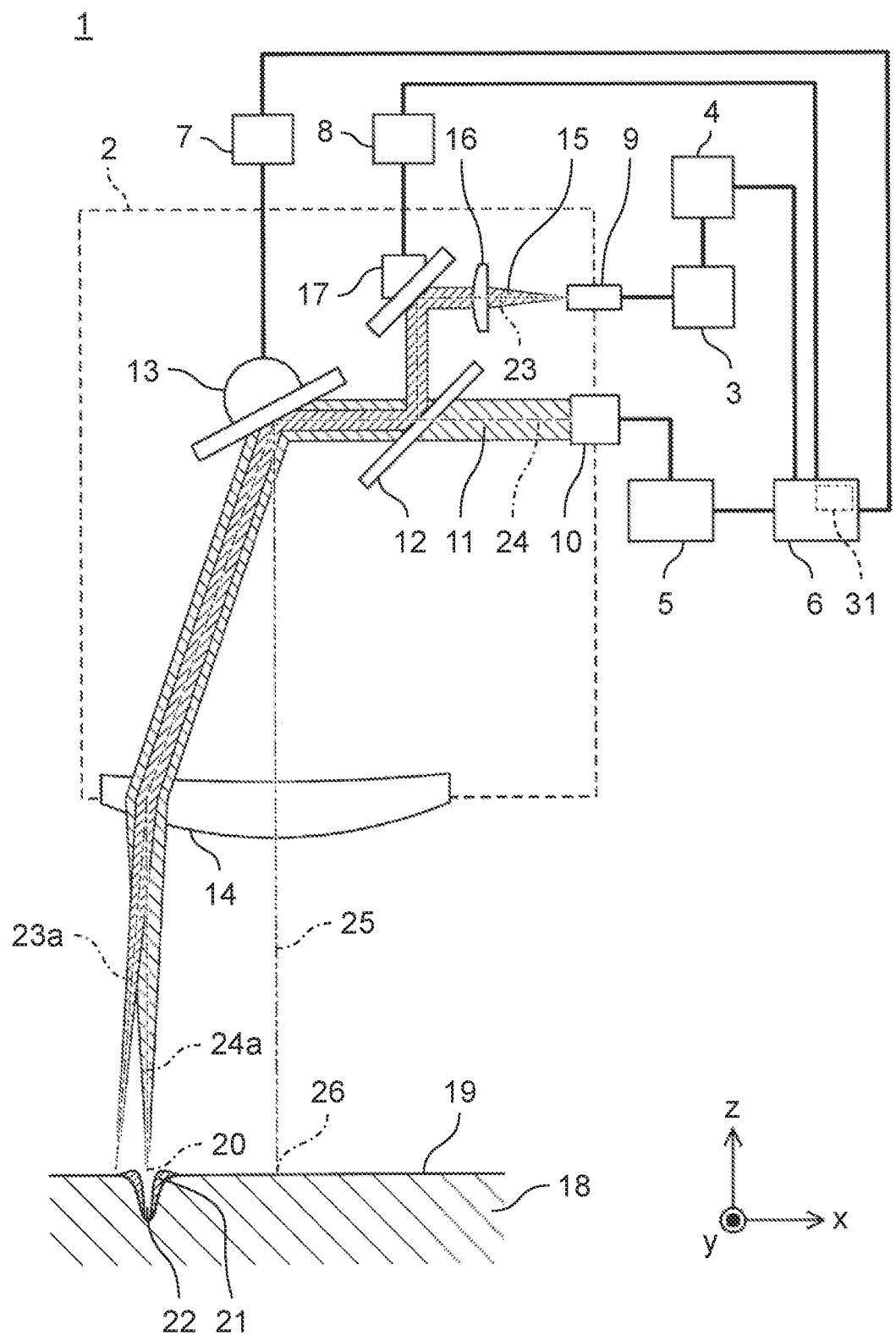
FIG. 2 is a view schematically illustrating the laser processing apparatus in a state where a first mirror is operated from an original position.

As illustrated in FIG. 2, processing laser light 11 and measurement light 15 reflected by first mirror 13 travel on the same optical axis until reaching lens 14. However, after transmitting through lens 14, a deviation occurs between processing laser light 11 and measurement light 15 in a travel direction.

That is, as illustrated in FIG. 2, a position of processing optical axis 24a which is an optical axis of processing laser light 11 is deviated from a position of measurement optical axis 23a which is an optical axis of measurement light 15. Therefore, measurement light 15 reaches a position different from a position of processing point 20.

This is due to a chromatic aberration of lens 14. The chromatic aberration is an aberration that occurs because a general optical material including lens 14 has a property which is changed in refractive index depending on a wavelength of light.

The chromatic aberration includes two types of aberrations, which are an axial chromatic aberration and a magnification chromatic aberration. The axial chromatic aberration indicates a property that a focal position of the lens is changed depending on a wavelength of light.

Meanwhile, the magnification chromatic aberration indicates a property that an image height on a focal surface is changed depending on the wavelength of light.

A deviation between a travel direction of processing laser light 11 (processing optical axis 24a) transmitted through lens 14 and a travel direction of measurement light 15 (measurement optical axis 23a) which is illustrated in FIG. 2 is caused by the above-described magnification chromatic aberration.

In laser processing apparatus 1 according to the present exemplary embodiment, the above-described axial chromatic aberration is also generated at the same time. However, the deviation between the travel direction of processing laser light 11 and the travel direction of measurement light 15 due to the axial chromatic aberration can be reduced as follows. That is, a distance between collimating lens 16 and measurement light inlet 9 may be adjusted, and measurement light 15 immediately after transmitting through collimating lens 16 may be slightly changed to a divergence state or a convergence state from a state of parallel light.

In FIG. 2, a distance from a position where measurement light 15 reaches processing surface 19 to processing original point 26 is greater than a distance from a position where processing laser light 11 reaches processing surface 19 to processing original point 26.

However, a distance of the former can be smaller than a distance of the latter due to a lens configuration of lens 14 and a magnitude relationship between wavelengths of processing laser light 11 and measurement light 15. Generally, light having a long wavelength reaches a position farther from processing original point 26 than light having a short wavelength.

A method of correcting a magnification chromatic aberration includes, for example, a method of adding a property of an achromatic lens to lens 14. However, when lens 14 is assumed to have both a property of an fθ lens and a property of an achromatic lens, a highly advanced optical design technology is required, and a design of lens 14 requires a great deal of time and cost.

Therefore, in the present exemplary embodiment, the magnification chromatic aberration is corrected at a low cost by operating measurement light deflection unit 17 as described below. In the following description, a deflection unit that changes an angle of measurement optical axis 23 is referred to as a "measurement light deflection unit". Measurement light deflection unit 17 according to the present exemplary embodiment is an example of the measurement light deflection unit.

Method of Correcting Magnification Chromatic Aberration

Figure 3:
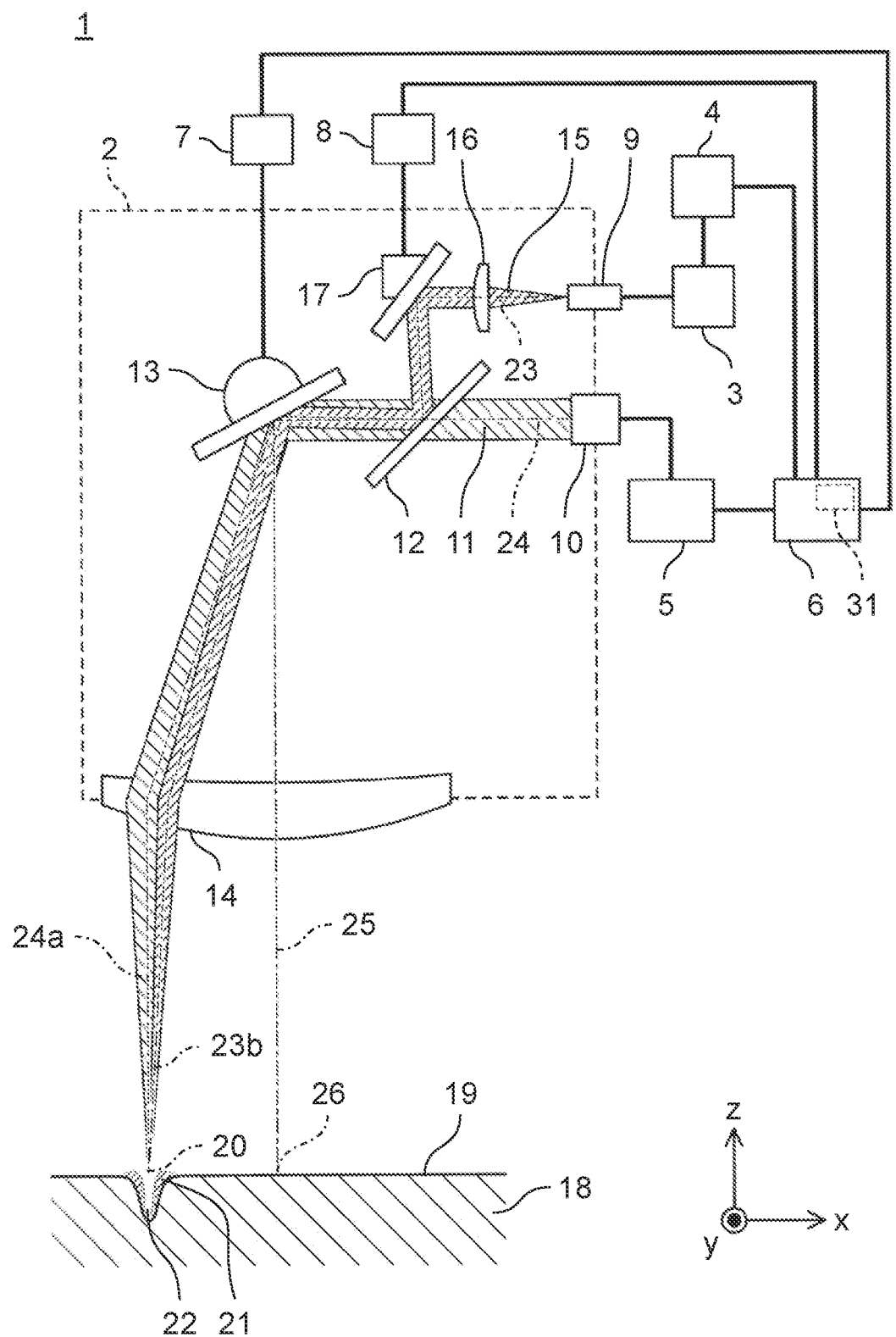
FIG. 3 is a view schematically illustrating the laser processing apparatus in a state where deviations in arrival positions of processing laser light and measurement light due to magnification chromatic aberration are corrected.

Next, a method of correcting a magnification chromatic aberration will be described with reference to FIG. 3. FIG. 3 is a view schematically illustrating laser processing apparatus 1 in a state where deviations in arrival positions of processing laser light 11 and measurement light 15 due to the magnification chromatic aberration are corrected.

In FIG. 3, measurement light deflection unit 17 is operated by a predetermined operation amount (may be called an operation angle) from an original position. Thereby, as illustrated in FIG. 3, processing optical axis 24 of processing laser light 11 and measurement optical axis 23 of measurement light 15 are not disposed on the same axis while reaching lens 14 from dichroic mirror 12.

However, processing laser light 11 and measurement light 15 each reach the same position on processing surface 19, that is, processing point 20 after transmitting through lens 14.

In FIG. 3, processing optical axis 24a of processing laser light 11 passes through the same position as processing optical axis 24a illustrated in FIG. 2. Meanwhile, in FIG. 3, measurement optical axis 23b of measurement light 15 corrected by an operation of measurement light deflection unit 17 passes through a position different from measurement optical axis 23a illustrated in FIG. 2.

The operation amount (that is, an angle by which measurement light deflection unit 17 is rotated from an original position) of measurement light deflection unit 17 is associated one-to-one with the operation amount of first mirror 13.

Since the operation amount of first mirror 13 is uniquely determined by the position of processing point 20, the operation amount of measurement light deflection unit 17 is also uniquely determined by the position of processing point 20.

In the following, an operation amount of measurement light deflection unit 17 will be referred to as a "correction amount".

Relationship Between Correction Amount and Scan Angle

Next, the relationship between the correction amount and the scan angle will be described.

lens 14 which is an fθ lens has a relationship of h=fθ when a focal length of lens 14 is referred to as f, an angle of light incident on lens 14 from lens optical axis 25 is referred to as θ, and a distance (hereinafter referred to as an image height) from an optical axis (lens optical axis 25) on an image surface (processing surface 19) of a light beam transmitting through lens 14 is referred to as h.

As described above, first mirror 13 has two axes that perform a rotational operation. It is assumed that the two axes are the x-axis and the y-axis, an angle of an x-axis component from lens optical axis 25 of the light reflected by first mirror 13 is referred to as θx, and an angle of a y-axis component from the same lens optical axis 25 is referred to as θy.

When image heights in the x and y directions on the image surface of the light beam transmitting through lens 14 are respectively referred to as x and y, a relationship of $x=f\theta x$ and $y=f\theta y$ is established.

Thus, when a position where processing laser light 11 reaches processing surface 19 is referred to as (x, y), (x, y)=(fθx, fθy).

Further, an emission angle of light reflected from mirror 13 when the light is incident on mirror 13 changes by an angle amount twice the operation amount of first mirror 13.

Therefore, when the operation amount of first mirror 13 is referred to as (φx, φy), a relationship of (2φx, 2φy)=(θx, θy) is established. In the following description, the operation amounts (φx, φy) of first mirror 13 are referred to as "scan angles".

As such, when the scan angles (φx, φy) of first mirror 13 are determined, laser processing apparatus 1 according to the present exemplary embodiment also determines an arrival position of processing laser light 11 on processing surface 19, that is, the position (x, y) of processing point 20.

As described above, the scan angle is uniquely determined by the position of processing point 20, and likewise, a correction amount is also uniquely determined by the position of processing point 20.

Therefore, data (correction number table data) for correcting a deviation of measurement light 15 due to a magnification chromatic aberration is previously calculated, and laser processing apparatus 1 according to the present exemplary embodiment operates measurement light deflection unit 17 by the correction amount corresponding to the position of processing point 20 by using the correction number table data when processing workpiece 18. The correction number table data represents a corresponding relationship between a scan angle and a correction amount for each processing point 20.

Details of Correction Number Table Data

Hereinafter, tracks of each of processing laser light 11 and measurement light 15 on processing surface 19, which are the premise of calculating the correction amount, will be described with reference to FIG. 4.

Figure 4:
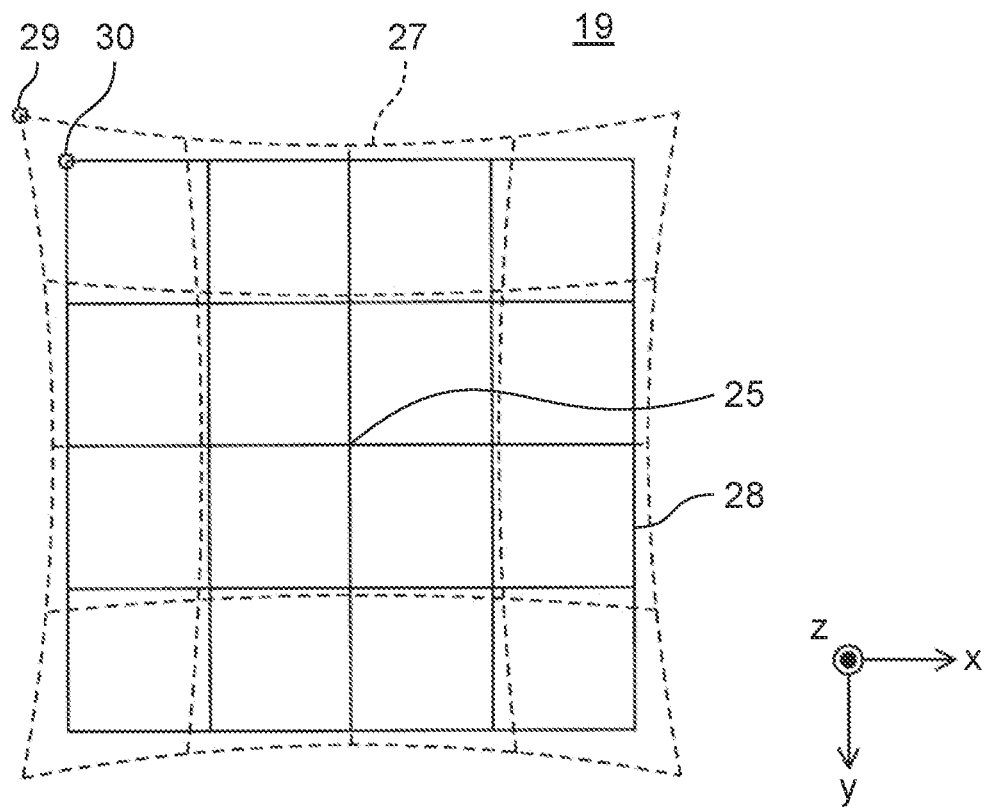
FIG. 4 is a diagram schematically illustrating tracks of each of the processing laser light and the measurement light on a processing surface when a surface (processing surface) of a workpiece is scanned in a grid shape by operating only the first mirror without operating a measurement light deflection unit.

FIG. 4 is a diagram schematically illustrating tracks of each of processing laser light 11 and measurement light 15 on processing surface 19 when a surface (processing surface 19) of workpiece 18 is scanned in a grid shape by operating only first mirror 13 without operating measurement light deflection unit 17.

FIG. 4 illustrates a state where processing surface 19 is viewed from lens 14 side. An orthogonal grid shape pattern of a solid line in FIG. 4 represents a track (processing light track 28) of processing laser light 11. An orthogonal grid shape pattern of a dashed line in FIG. 4 represents a track (measurement light track 27) of measurement light 15.

The orthogonal grid shape patterns are tracks when a surface (processing surface 19) of workpiece 18 is scanned in a grid shape by operating only first mirror 13 without operating measurement light deflection unit 17.

In the example illustrated in FIG. 4, measurement light deflection unit 17 does not operate, and thereby, a magnification chromatic aberration is not corrected. Thus, in the vicinity of processing original point 26 illustrated in FIGS. 1 to 3, tracks of each of processing laser light 11 and measurement light 15 match each other, but a deviation between both light increases as a distance from processing original point 26 increases.

Thereby, processing light track 28 draws an orthogonal grid shape pattern without distortion, while measurement light track 27 draws a distorted pincushion type track.

A distorted shape of measurement light track 27 illustrated in FIG. 4 can be changed according to optical characteristics of lens 14.

Further, a deviation amount of a position corresponding to each of processing light track 28 and measurement light track 27 also depends on optical characteristics and an optical design of lens 14 likewise.

In a general example, a commercially available fθ lens having a focal length of 250 mm and a processing surface region of approximately 200 mm in diameter has a deviation of 0.2 mm to 0.4 mm that occurs in the vicinity of an outermost circumference of the processing surface region.

In contrast to this, a diameter of keyhole 22 (for example, see FIG. 1) generated by applying processing laser light 11 to processing point 20 is approximately as small as 0.03 mm to 0.2 mm, although the diameter depends on power and quality of the processing laser light.

Therefore, measurement light 15 does not reach a bottom surface of keyhole 22 due to a positional deviation between processing laser light 11 and measurement light 15 caused by a chromatic aberration of lens 14, and a correct penetration depth cannot be measured.

FIG. 4 illustrates an orthogonal grid shape pattern of 4×4 squares at equal intervals, but a shape of the grid shape pattern is not limited thereto.

For example, the number of squares of the orthogonal grid shape pattern may be increased, or an interval between grids in a region requiring particularly high accuracy may be reduced in relation to magnification chromatic aberration characteristic of the fθ lens.

Further, a radial grid shape pattern may be set instead of the orthogonal grid shape pattern. However, in the present exemplary embodiment, the correction amount is set on two axes of the x-axis and the y-axis, and thus, the orthogonal grid shape pattern is more preferable.

Comparing processing light track 28 with measurement light track 27 illustrated in FIG. 4, it can be seen that a deviation occurs in respective corresponding grid points in the respective orthogonal grid shape patterns. That is, it can be seen that there is a deviation between processing light grid point 30 at a specific location on processing light track 28 and corresponding measurement light grid point 29 of measurement light track 27.

In order to generate the correction number table data, the correction amount needs to be calculated (grid point of the grid shape pattern is set to a target position) such that one processing light grid point 30 at the specific location on processing light track 28 and corresponding measurement light grid point 29 of measurement light track 27 match each other.

Method of Calculating Correction Amount

Next, a method of calculating a correction amount at processing light grid point 30 will be described. FIG. 5 is a view illustrating a configuration example of beam position measurement unit 38 used for calculating the correction amount at processing light grid point 30.

Beam position measurement unit 38 is installed between lens 14 and workpiece 18. Beam position measurement unit 38 includes position measurement mirror 39, two-dimensional imaging element 40, and beam terminator 41.

Position measurement mirror 39 has a function of attenuating power of processing laser light 11, divides light having a wavelength of processing laser light 11 into reflection light and transmission light, and has characteristics that reflect light having a wavelength of measurement light 15.

A reflectance of the wavelength of processing laser light 11 of position measurement mirror 39 is set such that power of reflected processing laser light 11 is approximately the same as power of reflected measurement light 15.

For example, when a fiber laser having a rated output of 1 kW or more to be used in general processing is selected for processing laser light 11, minimum power that can be output by processing laser light 11 is approximately 100 W.

In contrast to this, when an OCT light source is used as measurement light 15, an output is several tens of mW. Therefore, in order to reduce an output of processing laser light 11 of 100 W to the same order (several tens of mW) as measurement light 15 of several tens of mW, the reflectance of wavelength of processing laser light 11 of position measurement mirror 39 is preferably set to 0.1% or less.

Meanwhile, measurement light 15 does not need to be attenuated, and thus, the reflectance of the wavelength of measurement light 15 of position measurement mirror 39 is preferably set to 90% or more.

Two-dimensional imaging element 40 has a function of measuring positions of processing laser light 11 and measurement light 15. Two-dimensional imaging element 40 may be any sensor as long as the sensor has sensitivity to wavelengths of processing laser light 11 and measurement light 15, and a commercially available industrial camera including an element such as a charge-coupled device (CCD), a complementary metal oxide-semiconductor (CMOS), or indium gallium arsenide (InGaAs), a two-dimensional beam profiler, or the like can be used therefor.

Beam terminator 41 has a function of terminating processing laser light 11 transmitting through position measurement mirror 39.

Processing laser light 11 and measurement light 15 transmitting through lens 14 are divided into processing laser light 11*a* and measurement light 15*a* that are reflected by position measurement mirror 39 and processing laser light 11*b* that transmits through position measurement mirror 39.

Processing laser light 11*b* transmitting through position measurement mirror 39 is terminated by beam terminator 41.

Meanwhile, processing laser light 11*a* and measurement light 15*a* reflected by position measurement mirror 39 are input to two-dimensional imaging element 40. Two-dimensional imaging element 40 measures positions of input processing laser light 11*a* and input measurement light 15*a*.

No optical element for transmitting light therethrough is not disposed in a section from lens 14 to two-dimensional imaging element 40, and only the light reflected by position measurement mirror 39 is transmitted to the section.

Further, optical path lengths of each of processing laser light 11 and measurement light 15 from lens 14 to two-dimensional imaging element 40 match an optical path length from lens 14 to processing point 20 when beam position measurement unit 38 is not installed.

Therefore, a relative positional relationship of measurement light 15 based on a position of processing laser light 11 measured by two-dimensional imaging element 40 matches a relationship between positions of processing laser light 11 and measurement light 15 at processing point 20 when beam position measurement unit 38 is not installed.

Figure 6:
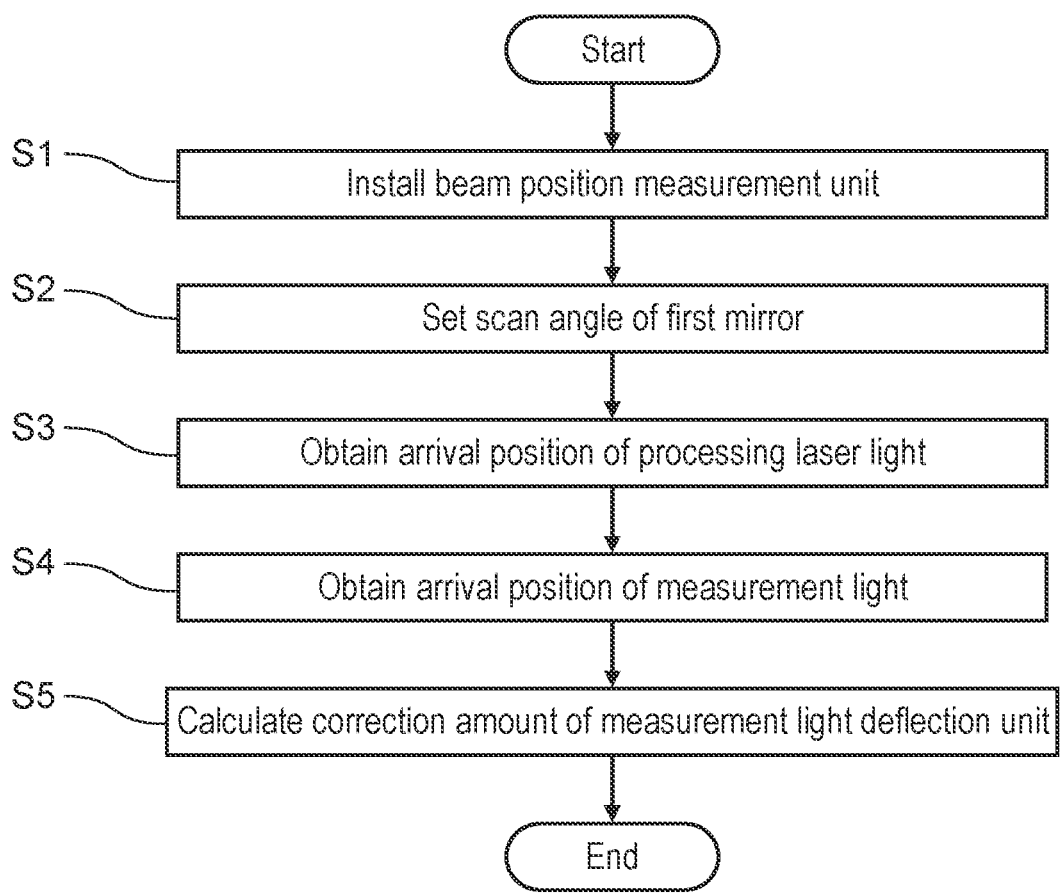
FIG. 6 is a flowchart illustrating a method of calculating the correction amount at the processing light grid point.

FIG. 6 is a flowchart illustrating a method of calculating a correction amount at processing light grid point 30.

In step S1, beam position measurement unit 38 is installed at processing light grid point 30 in which the correction amount is obtained. At this time, two-dimensional imaging element 40 is installed in a position where an optical path length from lens 14 to two-dimensional imaging element 40 matches an optical path length from lens 14 to processing point 20 when beam position measurement unit 38 is not installed.

In step S2, a scan angle of first mirror 13 is set such that processing laser light 11 reaches processing light grid point 30 in which the correction amount is obtained.

In step S3, processing laser light 11 is applied, and an arrival position at which processing laser light 11 reaches two-dimensional imaging element 40 is obtained by using beam position measurement unit 38.

At this time, an output when applying processing laser light 11 is preferably set to be 10% or more of a rated output of laser oscillator 5. In particular, when laser oscillator 5 is a fiber laser, a case where the output is set to less than 10% of the rated output is a case where an oscillation state of a laser is unstable, and this is because the arrival position where processing laser light 11 reaches two-dimensional imaging element 40 cannot be measured accurately.

In step S4, measurement light 15 is applied, and an arrival position where measurement light 15 reaches two-dimensional imaging element 40 is obtained by using beam position measurement unit 38.

In step S5, a correction amount of measurement light deflection unit 17 is calculated by referring to the measurement result of two-dimensional imaging element 40 of beam position measurement unit 38 such that the arrival position of processing laser light 11 obtained in step S3 matches the arrival position of measurement light 15. The correction amount is calculated by, for example, controller 6.

The correction amount at processing light grid point 30 can be calculated by the method described above. By calculating the correction amount, an output of processing laser light 11 input to two-dimensional imaging element 40 can be approximated to an output of measurement light 15, and thus, the same two-dimensional imaging element 40 can be used.

Generally, when a position of laser light having a significantly different output is measured by two-dimensional imaging element 40, different two-dimensional imaging element 40 according to the output needs to be used.

Meanwhile, according to the method of calculating the correction amount described above, there is no need to replace two-dimensional imaging element 40 when measuring arrival positions of processing laser light 11 and measurement light 15, and an installation error of two-dimensional imaging element 40 can be eliminated. Therefore, the arrival positions of processing laser light 11 and measurement light 15 can be accurately obtained.

Further, an optical path from lens 14 to two-dimensional imaging element 40 includes only an optical path through which reflected light travels without including an optical path through which light transmitting through an optical component travels, thereby being not affected by refraction or a chromatic aberration of a glass material. Therefore, the arrival positions of processing laser light 11 and measurement light 15 can be accurately obtained.

Although one position measurement mirror 39 is used for beam position measurement unit 38 illustrated in FIG. 5, the number of position measurement mirrors 39 is not limited to one and may be two or more.

Figure 7:
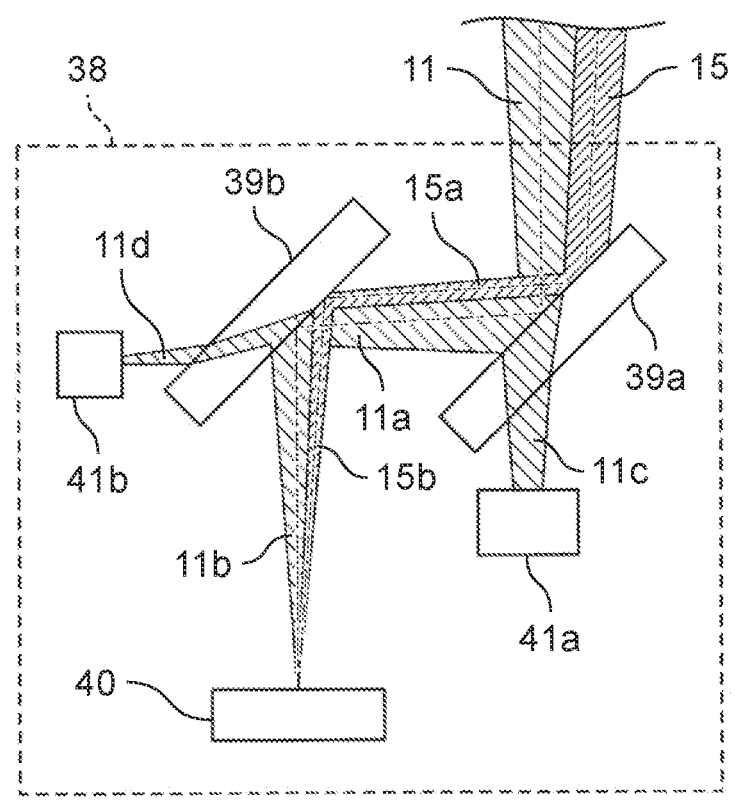
FIG. 7 is a view illustrating a configuration example of the beam position measurement unit including two position measurement mirrors.

FIG. 7 is a view illustrating a configuration example of beam position measurement unit 38 including two position measurement mirrors 39a and 39b.

Two position measurement mirrors 39a and 39b are separated from each other in the x-axis direction and disposed in parallel with each other.

Processing laser light 11 and measurement light 15 are divided into processing laser light 11a and measurement light 15a reflected by position measurement mirror 39a and processing laser light 11c transmitting through position measurement mirror 39a.

Processing laser light 11a is divided into processing laser light 11b reflected by position measurement mirror 39b and processing laser light 11d transmitting through position measurement mirror 39b. Processing laser light 11b is input to two-dimensional imaging element 40.

Measurement light 15a is input to two-dimensional imaging element 40 as measurement light 15b reflected by position measurement mirror 39b.

At this time, an optical path from position measurement mirror 39a to two-dimensional imaging element 40 includes only an optical path through which reflected light travels without including an optical path through which light transmitting through an optical component travels.

Further, two-dimensional imaging element 40 is installed in a position where the optical path length from lens 14 to two-dimensional imaging element 40 matches the optical path length from lens 14 to processing point 20 when beam position measurement unit 38 is not installed.

Processing laser light 11c transmitting through position measurement mirror 39a is terminated by beam terminator 41a.

Processing laser light 11d transmitting through position measurement mirror 39b is terminated by beam terminator 41b.

As such, by combining a plurality of position measurement mirrors 39a and 39b, power of processing laser light 11 and measurement light 15 reaching two-dimensional imaging element 40 is adjusted to the same extent.

Beam position measurement units 38 illustrated in FIGS. 5 and 7 include position measurement mirrors 39 as optical elements for reflecting processing laser light 11 and measurement light 15, but position measurement mirrors 39 may each be combined with a total reflection mirror. Even when the total reflection mirror is combined therewith, an optical path from lens 14 to two-dimensional imaging element 40 includes only an optical path through which reflected light travels without including an optical path through which light transmitting through an optical component travels.

Shapes of position measurement mirrors 39 illustrated in FIGS. 5 and 7 are not limited to a flat plate shape, and position measurement mirrors 39 may have flat reflection surfaces by which processing laser light 11 and measurement light 15 are reflected.

Beam position measurement units 38 illustrated in FIGS. 5 and 7 have beam terminators 41, but beam terminators 41 may not be installed if there is no safety problem.

Although workpiece 18 is illustrated in FIG. 5 for the sake of convenient description, workpiece 18 may be omitted because workpiece 18 is not used when calculating the correction amount described above.

Angles of optical axis of processing laser light 11 and measurement light 15 incident on beam position measurement unit 38 are changed depending on a position of processing light grid point 30. Therefore, beam position measurement unit 38 may further include a mechanism for adjusting an angle of position measurement mirror 39 and a mechanism for adjusting a position of two-dimensional imaging element 40 in order to input processing laser light 11 and measurement light 15 to two-dimensional imaging element 40.

Beam position measurement unit 38 may be incorporated into laser processing apparatus 1 as a function of laser processing apparatus 1 or may be incorporated into another unit other than laser processing apparatus 1.

When beam position measurement unit 38 is incorporated into laser processing apparatus 1, two-dimensional imaging element 40 may be connected to controller 6, and controller 6 may control measurement light deflection unit 17 based on a measurement result of two-dimensional imaging element 40, and controller 6 may be configured to calculate a correction amount of measurement light deflection unit 17.

The method of calculating the correction amount described above is suitable when a laser (for example, a single mode fiber laser or the like) having excellent beam quality is used in processing head 2.

In the single mode fiber laser, a beam diameter of processing laser light 11 at processing point 20 is 50 µm or less, and a high accuracy of the correction amount (10 µm or less) is required, and this is because the correction amount required for a single mode can be calculated in the method of calculating the correction amount.

Method of Generating Correction Number Table Data

Figure 8:
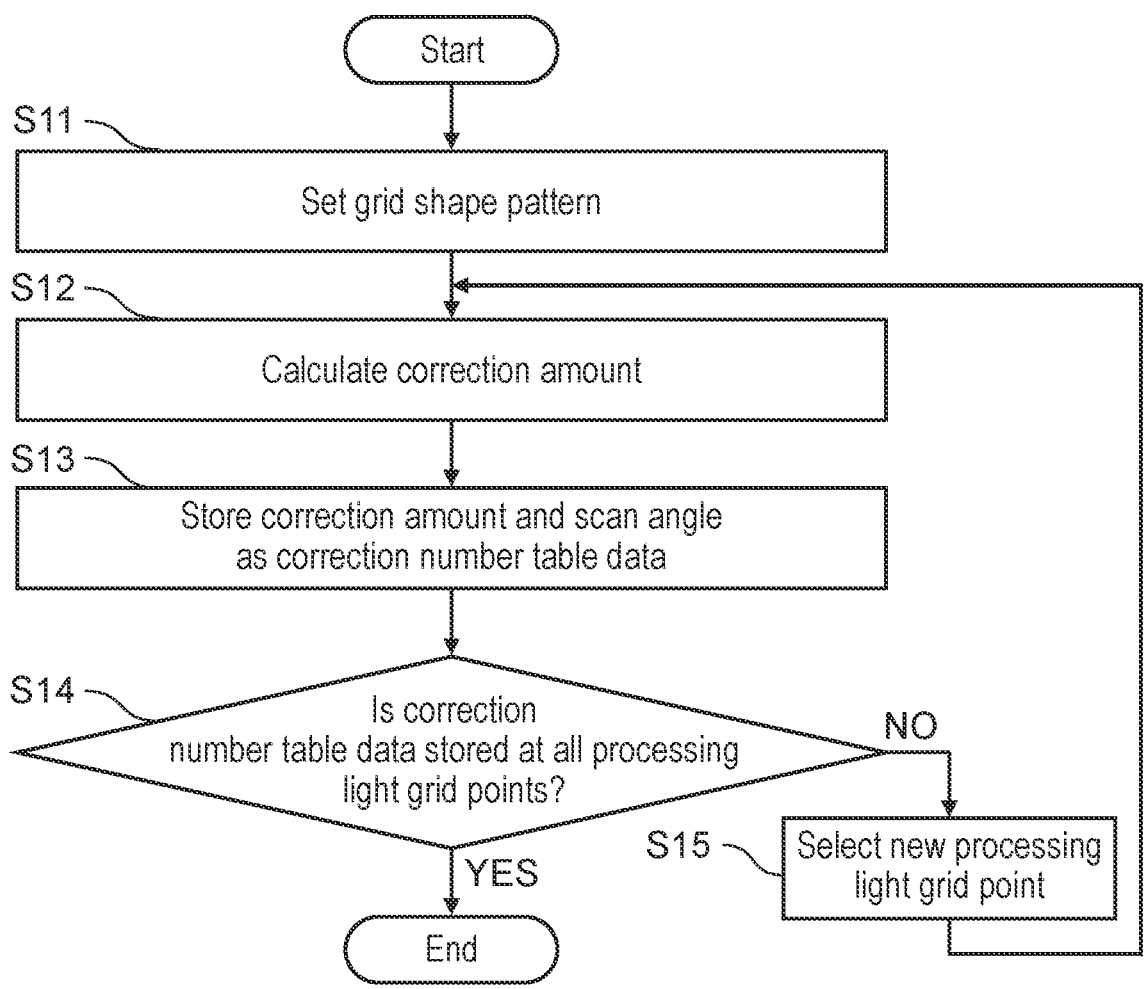
FIG. 8 is a flowchart illustrating a method of generating correction number table data.

Next, a method of generating correction number table data will be described with reference to FIG. 8. FIG. 8 is a flowchart illustrating the method of generating the correction number table data.

In step S11, controller 6 sets a grid shape pattern (for example, processing light track 28 illustrated in FIG. 4) that is a range in which laser processing is performed on processing surface 19 of temporary workpiece 18 (for example, a flat plate of metal). Temporary workpiece 18 is used for acquiring the correction number table data.

Further, controller 6 selects one processing light grid point from among a plurality of processing light grid points included in the grid shape pattern.

In step S12, controller 6 calculates a correction amount by performing a series of processes illustrated in FIG. 6 by using beam position measurement unit 38.

In step S13, controller 6 associates the correction amount calculated in step S12 with a scan angle when the correction amount is calculated, and stores the associated result in memory 31 as the correction number table data.

Thereafter, controller 6 performs a process of step S14. In step S14, controller 6 determines whether or not storing the correction number table data is completed for all of the plurality of processing light grid points included in the grid shape pattern set in step S11.

In step S14, when storing the correction number table data is not completed for all the processing light grid points (step S14: NO), controller 6 performs a process of step S15.

In step S15, controller 6 selects one new processing light grid point (that is, a processing light grid point in which storing the correction number table data is not performed), and then repeats the processes after step S12.

In step S14, when storing the correction number table data is completed for all the processing light grid points (step S14: YES), controller 6 ends a series of processes. The correction number table data is obtained by a series of processes.

When the grid shape pattern set in step S11 is the 4×4 grid shape pattern illustrated in FIG. 4, only the correction number table data at 16 processing light grid points is generated. It is preferable to generate more correction number table data by setting a grid shape pattern including 16 or more processing light grid points.

However, even when much correction number table data is generated, a scan angle of first mirror 13 can be set to any value as long as the scan angle is within an operation range of a mechanism, and thus, the scan angle may not match the correction number table data. In this case, the correction amount needs to be obtained by interpolating the correction number table data. A method of interpolating the correction number table data to obtain the correction amount will be described below.

Processing Data

Next, processing data used for processing workpiece 18 will be described.

In the related art, a laser processing apparatus including an fθ lens and a galvano mirror includes a controller that controls a laser oscillator and a galvano mirror by using a plurality of processing data set in time series. Processing is performed in time series in each processing point on a surface of a workpiece. The plurality of processing data is, for example, data in which an output instruction value to the laser oscillator and data items of a scan angle and a processing speed are set for each processing point.

In the present exemplary embodiment, the output instruction value (also referred to as laser output data) to laser oscillator 5, a position (also referred to as a processing point position) of processing point 20, and a scan angle are added to the data items of the processing data used by laser processing apparatus 1, and the above-described correction amount is added thereto.

In the following description, the processing data to which the correction amount is added as a data item is referred to as "corrected processing data".

An example of the corrected processing data will be described with reference to FIG. 9. FIG. 9 is a diagram illustrating an example of data items included in the corrected processing data.

The corrected processing data includes data number k, laser output data $L_k$, processing point position $x_k$, processing point position $y_k$, scan angle $\varphi x_k$, scan angle $\varphi y_k$, correction amount $\psi x_k$, and correction amount $\psi y_k$ as the data items.

Data number k indicates a sequence of the processing data. k represents an integer of 1 or more. A subscript k attached to each data item other than data number k represents a data item corresponding to a kth data number.

Laser output data $L_k$ indicates an output instruction value to laser oscillator 5.

Processing point position $x_k$ indicates a position of processing point 20 in the x-axis direction.

Processing point position $y_k$ indicates a position of processing point 20 in the y-axis direction.

Scan angle $\varphi x_k$ indicates a scan angle of first mirror 13 that performs scanning in the x-axis direction.

Scan angle $\varphi y_k$ indicates a scan angle of first mirror 13 that performs scanning in the y-axis direction.

Correction amount $\psi x_k$ indicates a correction amount of measurement light deflection unit 17 that performs correction of a position of measurement light 15 in the x-axis direction.

Correction amount $\psi y_k$ indicates a correction amount of measurement light deflection unit 17 that performs correction of a position of measurement light 15 in the y-axis direction.

The scan angle of the corrected processing data is an example of a first instruction value. The correction amount of the corrected processing data is an example of a second instruction value.

Figure 10:
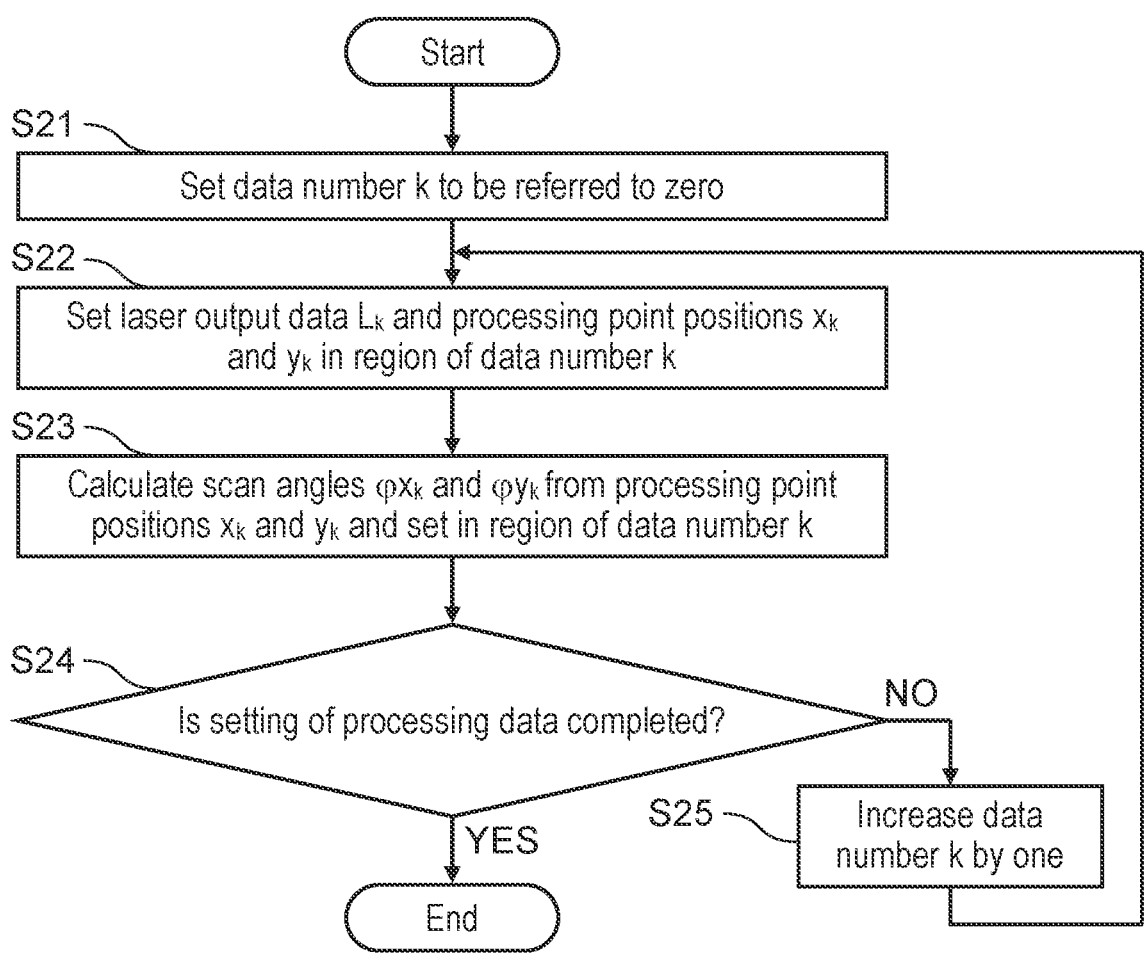
FIG. 10 is a flowchart illustrating a method of generating the corrected processing data.

Next, a method of generating processing data will be described with reference to FIG. 10. FIG. 10 is a flowchart illustrating the method of generating the processing data.

In step S21, controller 6 sets data number k to be referred to to zero. Data number k is assigned to a region storing the processing data in memory 31.

In step S22, controller 6 sets laser output data $L_k$, processing point position $x_k$, and processing point position $y_k$ in the region of data number k in memory 31.

The values are set by a user of laser processing apparatus 1 using an operator (for example, a keyboard, a mouse, a touch panel, or the like) (not illustrated) in order to implement desirable laser processing.

In step S23, controller 6 calculates scan angles $\varphi x_k$ and $\varphi y_k$ of first mirror 13 based on processing point positions $x_k$ and $y_k$ set in step S22, and stores calculated scan angles $\varphi x_k$ and $\varphi y_k$ in the region of data number k in memory 31.

When a focal length of lens 14 is f, there is a relationship of $(x_k, y_k) = (2f \cdot \varphi x_k, 2f \cdot \varphi y_k)$ between the processing point positions and the scan angles, and thus, the scan angles are automatically determined based on the processing point positions.

A relational equation between the processing point positions and the scan angles, a corresponding number table, and the like may be previously set by a user. In that case, scan angles $\varphi x_k$ and $\varphi y_k$ of first mirror 13 may be determined by using the relational equation between the processing point positions and the scan angles, the corresponding number table, and the like.

In step S24, controller 6 determines whether or not setting of the processing data is completed for all data numbers k.

In step S24, when setting of the processing data for all data numbers k is not completed (step S24: NO), controller 6 performs a process of step S25.

In step S25, controller 6 increases data number k to be referred to by one, and then repeats the processes of step S22 and subsequent steps.

In step S24, when setting of the processing data for all data numbers k is completed (step S24: YES), controller 6 ends a series of processes.

By the above-described processes, processing data is set for all data numbers k.

Method of Setting Correction Amount

Next, a method of setting a correction amount for each processing point position for the processing data set by the flow of FIG. 10 will be described.

Figure 11:
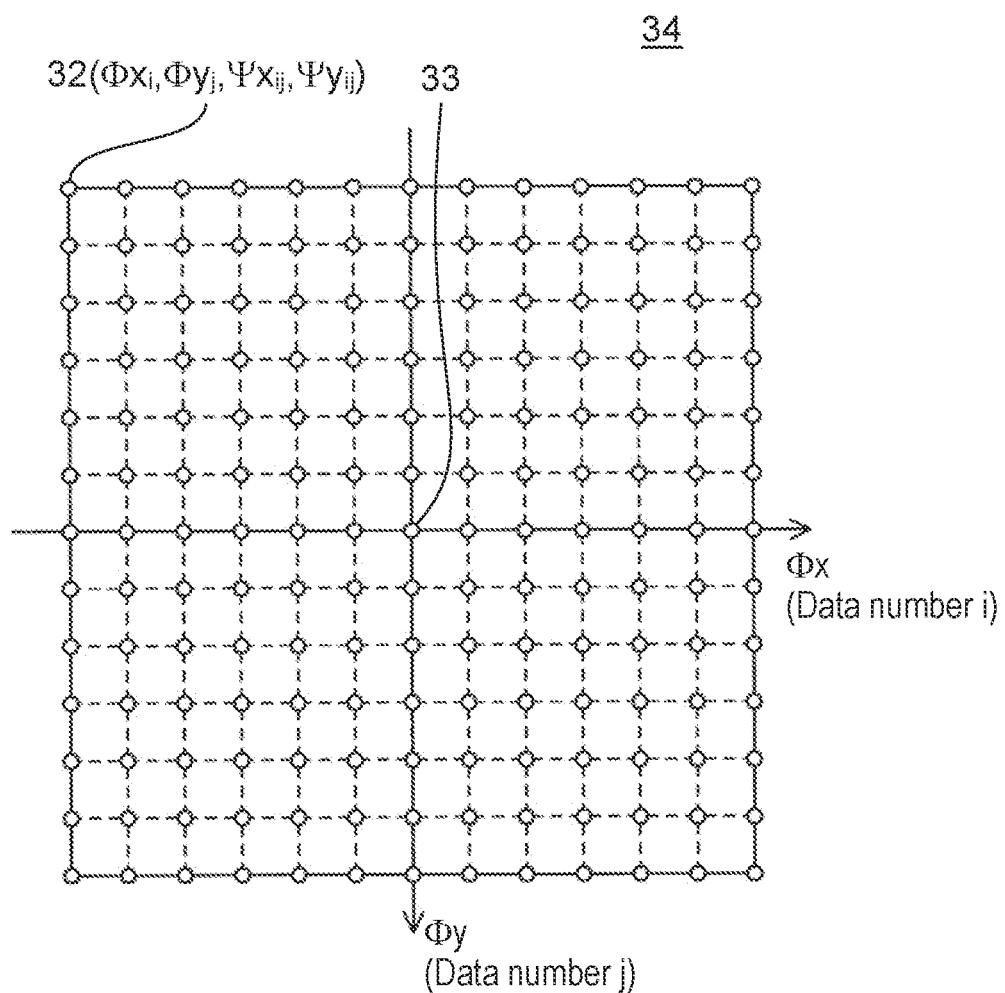
FIG. 11 is a diagram illustrating a correction number table of a processing point position schematically illustrating a configuration of correction number table data of a processing point position.

First, a configuration of correction number table data of a processing point position will be described with reference to FIG. 11. FIG. 11 is a diagram illustrating correction number table 34 of a processing point position schematically illustrating the configuration of the correction number table data of the processing point position.

In FIG. 11, corrected processing data set for each processing light grid point on processing surface 19 is schematically illustrated as a plurality of data points 32.

As described above, data point 32 illustrated in FIG. 11 includes a position (that is, a processing point position) on processing surface 19, a scan angle, and a correction amount.

Correction data point 33 illustrated in FIG. 11 corresponds to processing original point 26 on processing surface 19.

In the following description, positions of respective data points 32 of correction number table 34 of the processing point positions are represented by scan angles ($\varphi x$, $\varphi y$) for the sake of convenience.

It is assumed that a data number in a direction corresponding to a scan angle $\varphi x$ is i and a data number in a direction corresponding to a scan angle $\varphi y$ is j.

Respective data points 32 hold ($\Phi x_j$, $\Phi y_j$, $\Psi x_{ij}$, $\Psi y_{ij}$) that is a set of correction number table scan angles ($\Phi x_i$, $\Phi y_j$) and correction number table correction amounts ($\Psi x_{ij}$, $\Psi y_{ij}$).

Correction number table scan angles ($\Phi x_i$, $\Phi y_j$) include elements of the scan angles ($\varphi x$, $\varphi y$).

Figure 12:
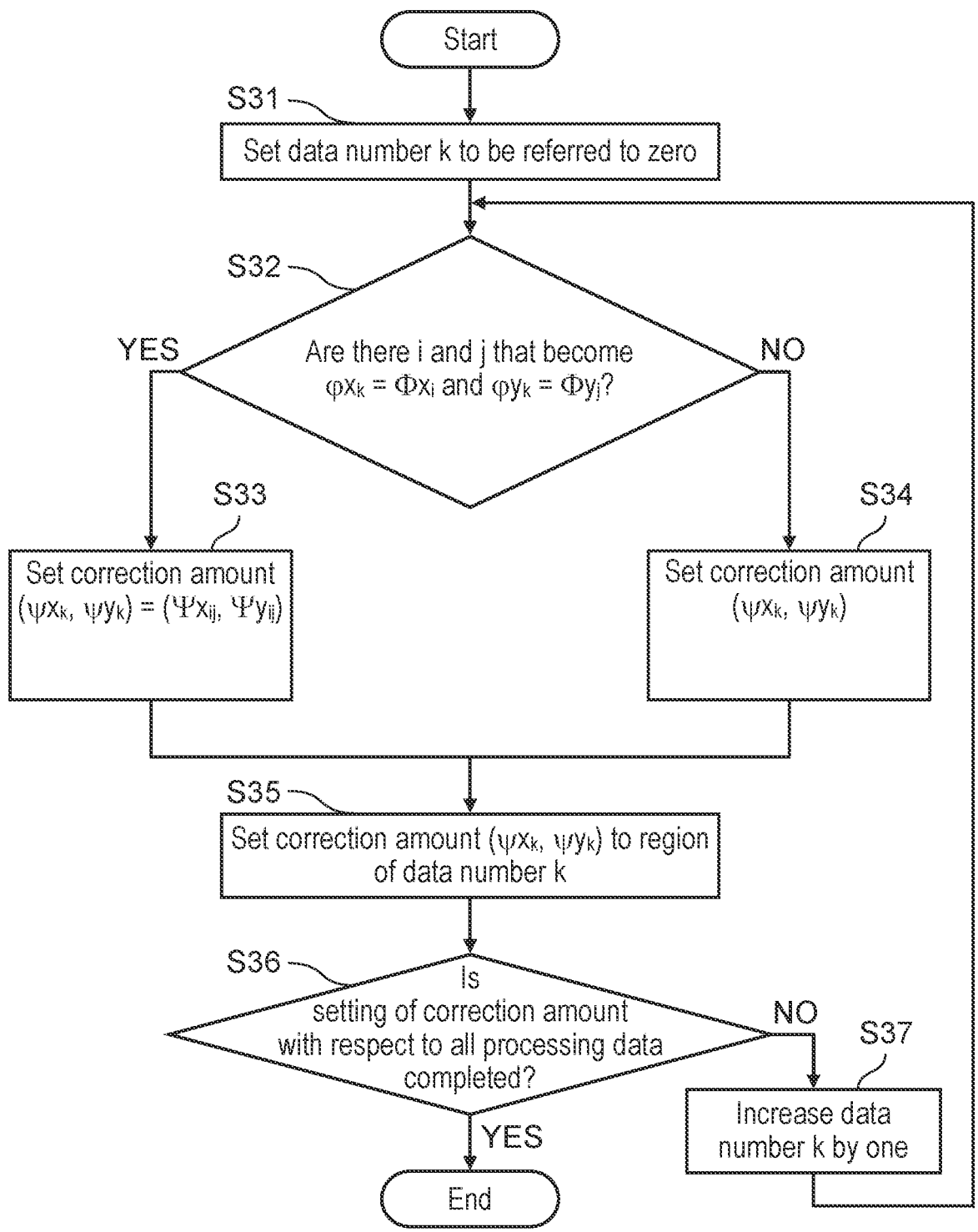
FIG. 12 is a flowchart illustrating a method of setting the correction amount.

Next, a flow of the method of setting the correction amount will be described with reference to FIG. 12. FIG. 12 is a flowchart illustrating the method of setting the correction amount.

In step S31, controller 6 sets data number k to be referred to zero.

In step S32, controller 6 compares scan angles ($\varphi x_k$, $\varphi y_k$) stored in a region of data number k in memory 31 with all correction number table scan angles ($\Phi x_i$, $\Phi y_j$) in correction number table 34 of the processing point positions.

Thereby, controller 6 determines whether or not there are data numbers i and j having relationships of $\varphi x_k = \Phi x_i$ and $\varphi y_k = \Phi y_j$.

That is, in step S32, it is determined whether or not there is a data item including a scan angle that is exactly the same as a scan angle set by a user in correction number table 34 of the processing point positions.

In step S32, when there are data numbers i and j having the relationships of $\varphi x_k = \Phi x_i$ and $\varphi y_k = \Phi y_j$ (step S32: YES), controller 6 performs a process of step S33.

In step S32, when there are no data numbers i and j having relationships of $\varphi x_k = \Phi x_i$ and $\varphi y_k = \Phi y_j$ (step S32: NO), controller 6 performs a process of step S34.

In step S33, controller 6 sets the correction amount as ($\psi x_k$, $\psi y_k$) = ($\Psi x_{ij}$, $\Psi y_{ij}$) by using data numbers i and j having relationships of $\varphi x_k = \Phi x_i$ and $\varphi y_k = \Phi y_j$.

That is, in present step S33, there is the data item including the scan angle that is exactly the same as the scan angle set by the user, a corresponding correction number table correction amount is set as the correction amount as it is.

In step S34, controller 6 performs an interpolation by using data of the closest four points surrounding scan angles ($\varphi x_k$, $\varphi y_k$) set by the user in correction number table 34 of the processing point positions, and sets correction amount ($\psi x_k$, $\psi y_k$). Details of step S34 will be described below.

In step S35, controller 6 sets (stores) correction amount ($\psi x_k$, $\psi y_k$) set in step S33 or step S34 in a region of data number k of the processing data in memory 31.

In step S36, controller 6 determines whether or not setting of the correction amount is completed for all the processing data stored in memory 31.

In step S36, when setting of the correction amount for all the processing data is not completed (step S36: NO), controller 6 performs a process of step S37.

In step S37, controller 6 increases data number k to be referred to by one, and then repeats processes step S32 and subsequent steps.

In step S37, when setting of the correction amount for all the processing data is completed (step S36: YES), controller 6 ends a series of processes.

By the above-described processes, correction amounts are set for all data numbers k in the processing data set by the flow of FIG. 10. That is, the corrected processing data is generated.

Details of Interpolation Process

Next, step S34 (interpolation process) illustrated in FIG. 12 will be described in detail. The interpolation process of step S34 is performed when scan angles ($\varphi x_k$, $\varphi y_k$) set by a user do not match any of correction number table scan angles ($\Phi x_i$, $\Phi y_j$) in data points 32.

Figure 13:
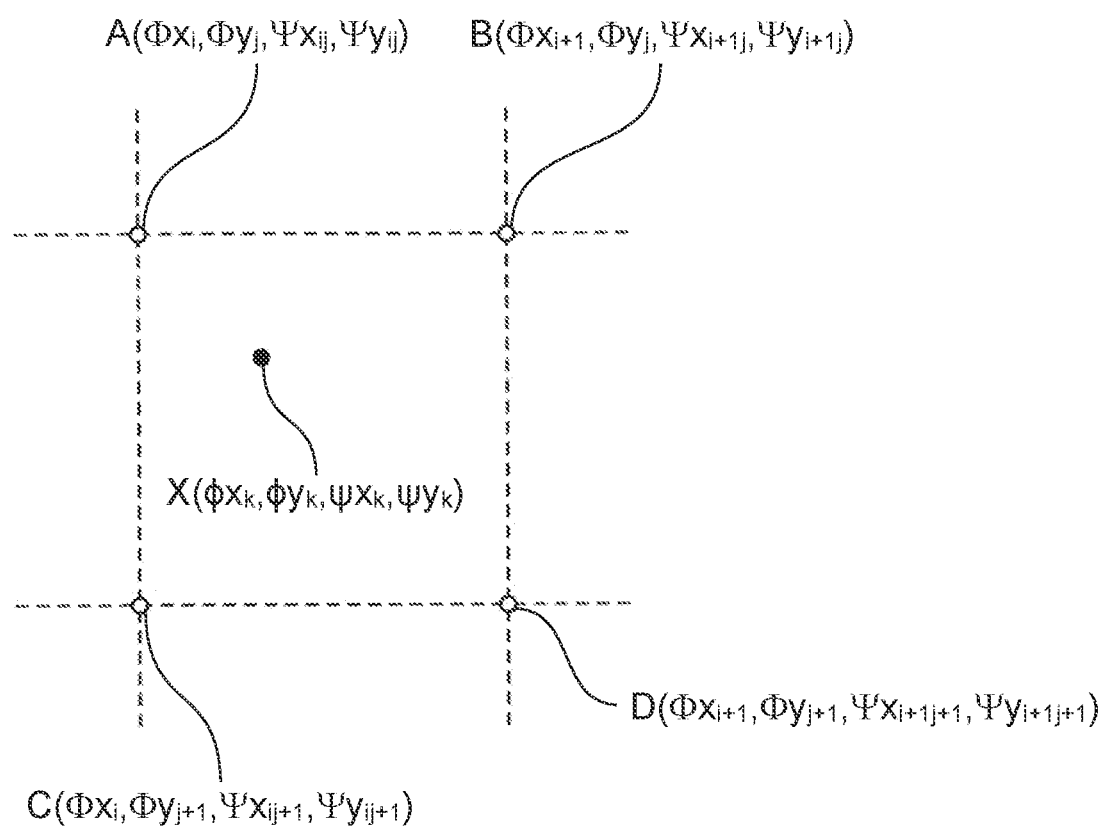
FIG. 13 is a diagram illustrating a relationship between a scan angle and a correction data point therearound when a scan angle set by a user as processing data does not match a correction number table scan angle of any of data points in the correction number table of the processing point position illustrated in FIG. 11.

FIG. 13 is a diagram illustrating a relationship between scan angle X and a correction data point therearound when scan angle X set by a user as processing data does not match a correction number table scan angle of any of data points 32 in correction number table 34 of the processing point positions illustrated in FIG. 11.

Points corresponding to scan angles X ($\varphi x_k$, $\varphi y_k$, $\psi x_k$, $\psi y_k$) are located in a grid formed by four correction data points A to D.

A value of correction data point A is ($\Phi x_i$, $\Phi y_j$, $\Psi x_{ij}$, $\Psi y_{ij}$). A value of correction data point B is ($\Phi x_{i+1}$, $\Phi y_j$, $\Psi x_{i+1j}$, $\Psi y_{i+1j}$). A value of correction data point C is ($\Phi x_i$, $\Phi y_{j+1}$, $\Psi x_{ij+1}$, $\Psi y_{ij+1}$). A value of correction data point D is ($\Phi x_{i+1}$, $\Phi y_{j+1}$, $\Psi x_{i+1j+1}$, $\Psi y_{i+1j+1}$).

Relationships of $\Phi x_i \leq \varphi x_k \leq \Phi x_{i+1}$ (equal signs are not established at the same time) and $\Phi y_j \leq \varphi y_k \leq \Phi y_{j+1}$ (equal signs are not established at the same time) are established.

Correction amounts ($\psi x_k$, $\psi y_k$) at this time is calculated by following equations (1) and (2) by using values of scan angles X ($\varphi x_k$, $\varphi y_k$) and values of correction data points A, B, C, and D.

$$\psi x_k = (E \times \Psi x_{ij} + F \times \Psi x_{i+1j} + G \times \Psi x_{ij+1} + H \times \Psi x_{i+1j+1}) / J \quad (1)$$

$$\psi y_k = (E \times \Psi y_{ij} + F \times \Psi y_{i+1j} + G \times \Psi y_{ij+1} + H \times \Psi y_{i+1j+1}) / J \quad (2)$$

E, F, G, H, and J in equations (1) and (2) are calculated by following equations (3) to (7).

$$E=(\varphi x_k-\Phi x_i)\times(\varphi y_k-\Phi y_j) \quad (3)$$

$$F=(\Phi x_{i+1}-\varphi x_k)\times(\varphi y_k-\Phi y_j) \quad (4)$$

$$G=(\varphi x_k-\Phi x_i)\times(\Phi y_{j+1}-\varphi y_k) \quad (5)$$

$$H=(\Phi x_{i+1}-\varphi x_k)\times(\Phi y_{j+1}-\varphi y_k) \quad (6)$$

$$J=(\Phi x_{i+1}-\Phi x_i)\times(\Phi y_{j+1}-\Phi y_j) \quad (7)$$

Correction amounts can be calculated based on scan angles set by a user through the interpolation process described above. In the above-described interpolation process, a linear interpolation method is used as an example, but other known two-dimensional interpolation methods (spline interpolation, quadratic curved surface approximation, and the like) may be used for the interpolation processing instead of the linear interpolation method.

Further, a high-order approximate curved surface for a correction amount for a scan angle is calculated previously from correction number table correction amounts ($\Psi x_{ij}$, $\Psi y_{ij}$) in correction number table 34 of processing point positions, and a correction amount corresponding to a scan angle may be calculated. The "correction number table correction amounts ($\Psi x_{ij}$, $\Psi y_{ij}$) in correction number table 34" represents all data points 32 of correction number table 34 illustrated in FIG. 11. Fitting by a least square method can be exemplified as a specific example of a method of calculating an approximate curved surface. For example, an equation $z=f(a_j, x, y)$ ($j=0 \ldots m-1$) of a curved surface can be obtained as an approximate curved surface for a three-dimensional data set ($x_i$, $y_i$, $z_i$) ($i=1 \ldots n$). $a_j$ represents a coefficient. By inserting a scan angle into x and y of the "three-dimensional data set ($x_i$, $y_i$, $z_i$)" and inserting a correction amount (either x-coordinate or y-coordinate) z, an approximate curved surface of the scan angles ($\Phi x_i$, $\Phi y_j$) for the correction amount $\Psi x_{ij}$ and an approximate curved surface of the scan angles ($\Phi x_i$, $\Phi y_j$) for the correction amount $\Psi y_{ij}$ can be calculated. As such, relational equations for obtaining correction amounts can be derived based on certain scan angles.

Laser Processing Method

Figure 14:
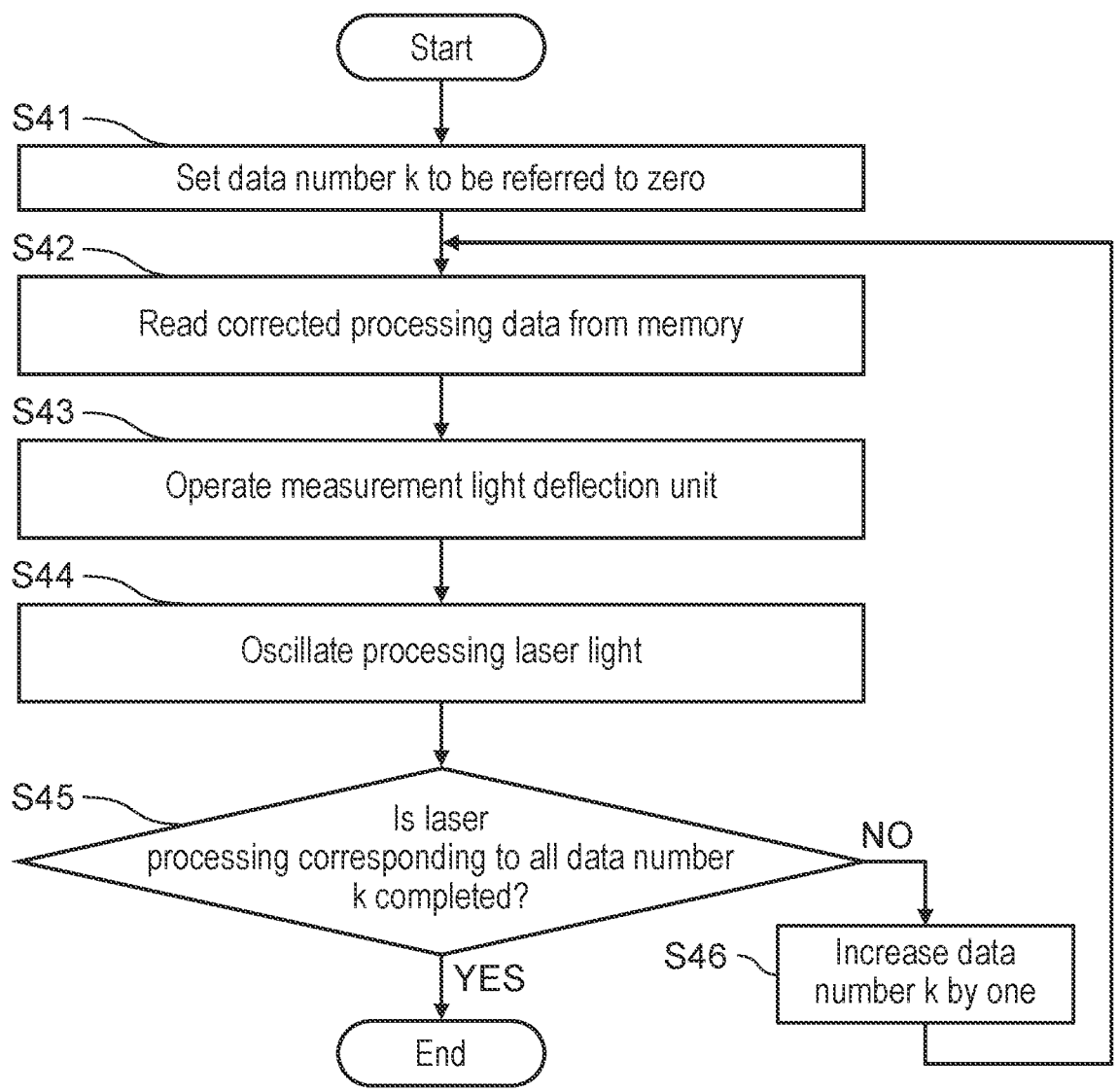
FIG. 14 is a flowchart illustrating a laser processing method performed by the laser processing apparatus according to the first exemplary embodiment of the present disclosure.

Next, a laser processing method performed by laser processing apparatus 1, according to an exemplary embodiment of the present disclosure, will be described with reference to FIG. 14. FIG. 14 is a flowchart illustrating the laser processing method performed by laser processing apparatus 1, according to the exemplary embodiment of the present disclosure.

In step S41, controller 6 sets the data number k to be referred to zero.

In step S42, controller 6 reads corrected processing data (laser output data $L_k$, scan angles ($\varphi x_k$, $\varphi y_k$) and correction amount ($\psi x_k$, $\psi y_k$)) corresponding to the data number k from memory 31.

In step S43, controller 6 operates first mirror 13 based on the scan angles ($\varphi x_k$, $\varphi y_k$) and operates measurement light deflection unit 17 based on the correction amount ($\psi x_k$, $\psi y_k$).

Specifically, controller 6 notifies first driver 7 of the scan angles ($\varphi x_k$, $\varphi y_k$). Thereby, first driver 7 operates first mirror 13 based on the scan angles ($\varphi x_k$, $\varphi y_k$).

Further, controller 6 notifies second driver 8 of the correction amount ($\psi x_k$, $\psi y_k$). Thereby, second driver 8 operates measurement light deflection unit 17 based on the correction amount ($\psi x_k$, $\psi y_k$).

In step S44, controller 6 oscillates processing laser light 11 from laser oscillator 5 based on the laser output data $L_k$.

Specifically, controller 6 transmits the laser output data $L_k$ indicating a laser output value to laser oscillator 5. Thereby, laser oscillator 5 oscillates processing laser light 11 based on the laser output data $L_k$.

In step S45, controller 6 determines whether or not laser processing corresponding to all the data numbers k stored in memory 31 is completed.

In step S45, controller 6 performs a process of step S46 when the laser processing corresponding to all the data numbers k is not completed (step S45: NO).

In step S46, controller 6 increases the data number k to be referred to by one, and then repeats processes of step S42 and subsequent steps.

In step S45, when the laser processing corresponding to all the data numbers k is completed (step S45: YES), controller 6 ends a series of processes.

By the above-described processing, the laser processing for all the data numbers k is performed.

Method of Measuring Depth of Keyhole

Figure 15:
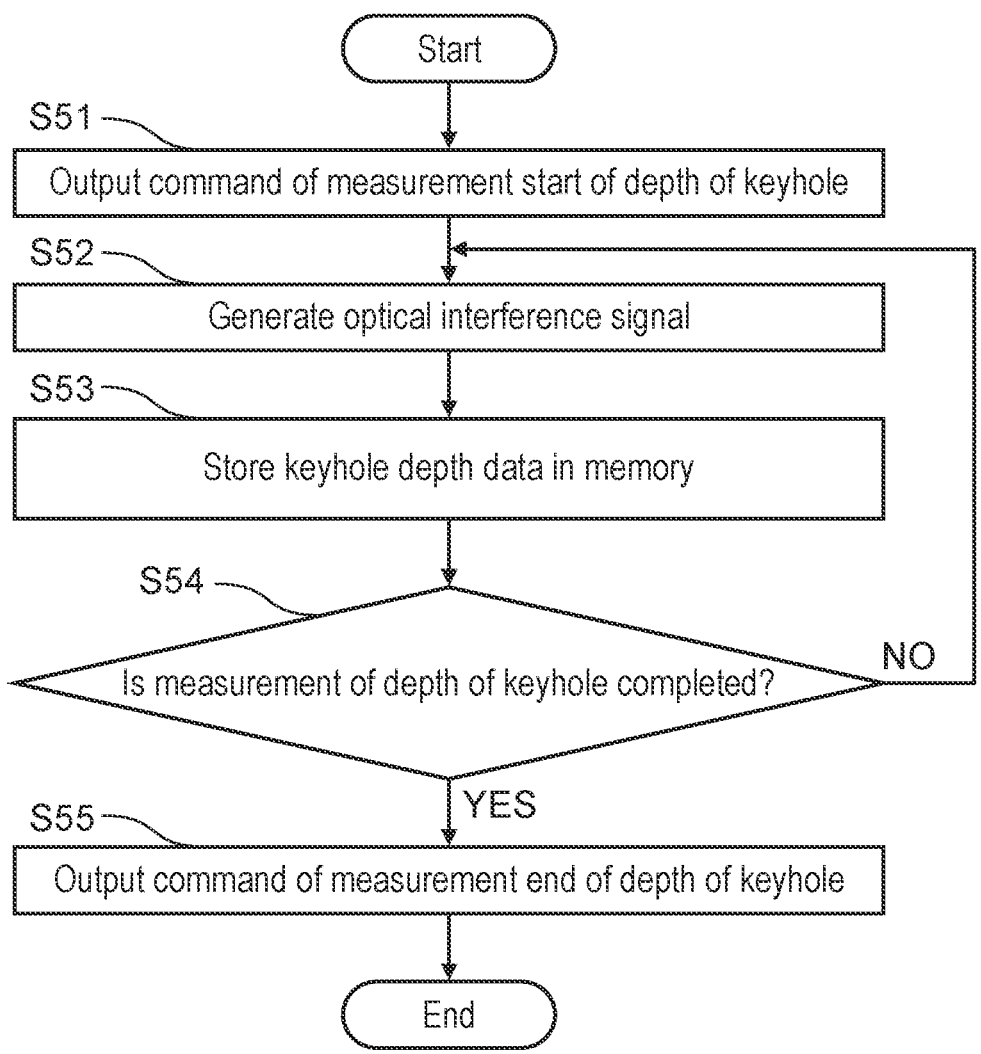
FIG. 15 is a flowchart illustrating a method of measuring a depth of a keyhole.

Next, a flow of the method of measuring a depth of keyhole 22 when performing the above-described laser processing method will be described with reference to FIG. 15. FIG. 15 is a flowchart illustrating the method of measuring the depth of keyhole 22.

In step S51, controller 6 acquires position data of processing surface 19 of unprocessed workpiece 18 before starting the laser processing method illustrated in FIG. 14.

The position data indicates a height of processing surface 19 in an unprocessed state (in other words, a position of processing surface 19 in the z-axis direction illustrated in FIG. 1 and the like). Further, controller 6 outputs a command to measurement processor 4 to start measuring the depth of keyhole 22.

When a series of processes relating to the laser processing illustrated in FIG. 14 starts, in step S52, measurement processor 4 outputs a command for emitting measurement light 15 to optical interferometer 3.

Optical interferometer 3 generates an optical interference signal according to an optical path difference between measurement light 15 reflected by a bottom surface of keyhole 22 and returned and reference light.

In step S53, measurement processor 4 calculates a depth (that is, a penetration depth) of keyhole 22 by using the position data of processing surface 19 of unprocessed workpiece 18 and the optical interference signal generated by optical interferometer 3. Controller 6 stores the calculated data indicating the depth of keyhole 22 in memory 31.

In step S54, controller 6 determines whether or not to end the measurement of the depth of keyhole 22.

For example, controller 6 continues to measure the depth of keyhole 22 when a series of processes relating to the laser processing is not completed, and ends the measurement of the depth of keyhole 22 when the series of processes relating to the laser processing is completed.

In step S54, when the measurement of the depth of keyhole 22 does not end (step S54: NO), controller 6 repeats processes of step S52 and subsequent steps.

In step S54, when the measurement of the depth of keyhole 22 ends (step S54: YES), controller 6 performs a process of step S55.

In step S55, controller 6 outputs a command to measurement processor 4 to end the measurement of the depth of keyhole 22 after the series of processes relating to the laser processing is completed.

The above-described command for starting the measurement of the depth of keyhole 22 and the command for ending the measurement of the depth of keyhole 22 may be output from a command output unit (not illustrated) instead of being output by controller 6. In that case, the commands are output as a user operates a command output device via an operator such as a keyboard.

Effects

As described above, beam position measurement unit 38 according to the present exemplary embodiment includes position measurement mirror 39 that reflects processing laser light 11 and measurement light 15 transmitting through lens 14, and two-dimensional imaging element 40 that measures positions of processing laser light 11 and measurement light 15 reflected by position measurement mirror 39.

Further, position measurement mirror 39 is set to a reflectance of a wavelength of processing laser light 11 that becomes power by which processing laser light 11 can be input to two-dimensional imaging element 40.

Further, two-dimensional imaging element 40 is installed at a position where an optical path length from lens 14 to two-dimensional imaging element 40 matches an optical path length from lens 14 to processing point 20.

Further, laser processing apparatus 1 sets a target position on processing surface 19 and sets a first instruction value (scan angle of measurement light deflection unit 17) at which processing laser light 11 reaches a target position.

Furthermore, laser processing apparatus 1 is configured to obtain a second instruction value (correction amount of measurement light deflection unit 17) based on positions of processing laser light 11 and measurement light 15 measured by beam position measurement unit 38.

With this configuration, deviations of arrival positions of processing laser light 11 and measurement light 15 on processing surface 19 after transmitting through lens 14, which occurs due to a magnification chromatic aberration of lens 14, can be corrected.

Thereby, the depth of keyhole 22 can be preferably measured by optical interferometer 3. That is, the depth of keyhole 22 can be accurately measured.

Figure 16:
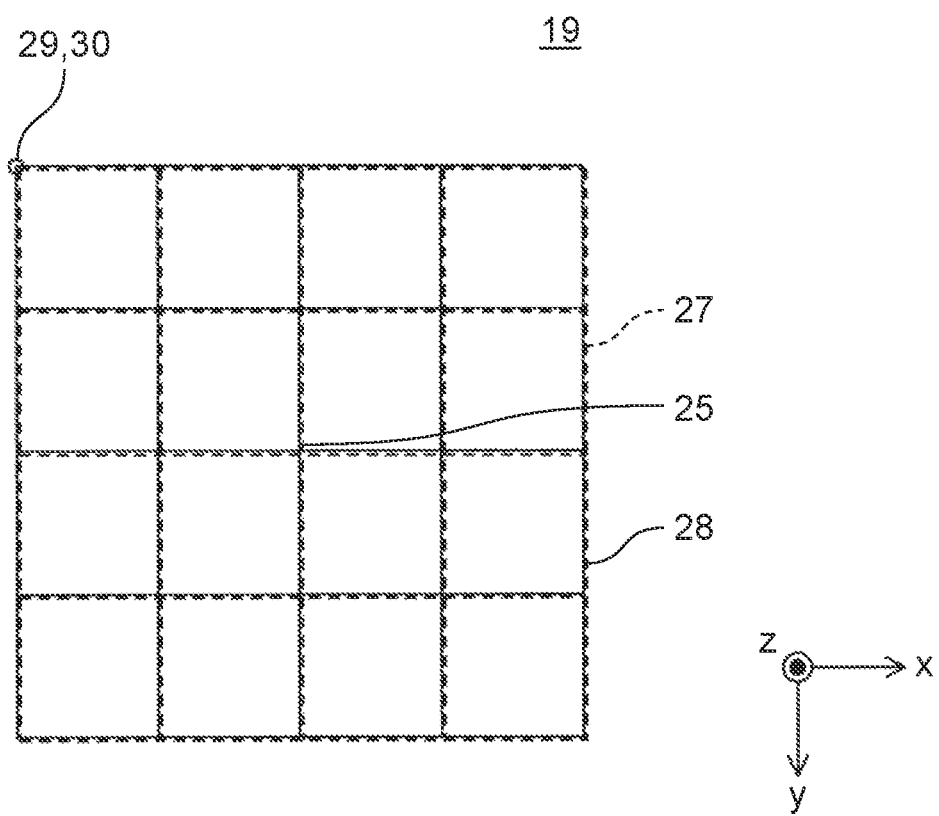
FIG. 16 is a diagram illustrating tracks of the processing laser light and the measurement light on the processing surface in a state where an influence of magnification chromatic aberration is corrected by an operation of the measurement light deflection unit.

FIG. 16 is a diagram illustrating tracks of processing laser light 11 and measurement light 15 on processing surface 19 in a state where an influence of a magnification chromatic aberration is corrected by an operation of measurement light deflection unit 17.

According to FIG. 16, it can be seen that processing light track 28 which is the track of processing laser light 11 matches measurement light track 27 which is the track of measurement light 15.

Further, it can be seen that processing light grid point 30 of one of specific locations on processing light track 28 matches corresponding measurement light grid point 29 of measurement light track 27.

The present disclosure is not limited to the description of the above-described exemplary embodiment, and various modifications can be made without departing from the idea of the present exemplary embodiment. Hereinafter, a modification example of the present exemplary embodiment will be described.

FIRST MODIFICATION EXAMPLE

In the above-described exemplary embodiment, a case where measurement light deflection unit 17 which is a galvano mirror is used as a measurement light deflection unit for changing an optical axis direction of measurement light 15 is described as an example, but the present disclosure is not limited thereto.

The measurement light deflection unit used for laser processing apparatus 1 is installed between, for example, measurement light inlet 9 and dichroic mirror 12 and may have a configuration in which the optical axis direction of measurement light 15 can be changed by a control of controller 6.

Figure 17:
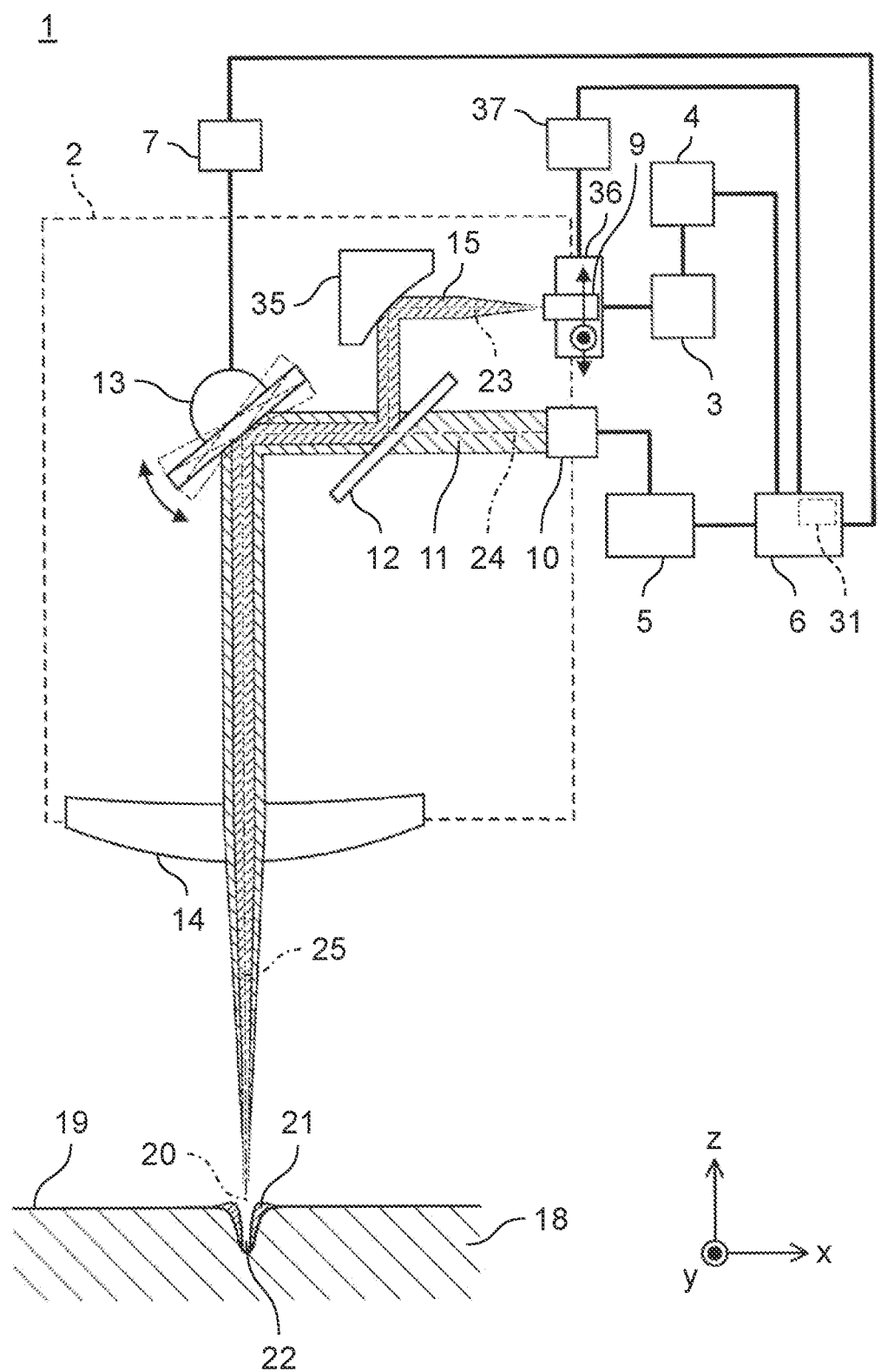
FIG. 17 is a view schematically illustrating a configuration of a laser processing apparatus according to a first modification example of the present disclosure.

An example of the measurement light deflection unit configured as such is illustrated in FIG. 17. FIG. 17 is a view schematically illustrating a configuration of laser processing apparatus 1 according to a first modification example of the present disclosure.

Laser processing apparatus 1 illustrated in FIG. 17 includes second mirror 35 instead of measurement light deflection unit 17 illustrated in FIG. 1 and the like, and further includes movement stage 36 and stage driver 37.

Laser processing apparatus 1 illustrated in FIG. 17 does not include collimating lens 16 illustrated in FIG. 1 and the like.

Second mirror 35 is a parabolic mirror fixed between measurement light inlet 9 and dichroic mirror 12.

Second mirror 35 may be a micro electro mechanical systems (MEMS) mirror or the like.

Movement stage 36 is provided at measurement light inlet 9. Stage driver 37 is electrically connected to controller 6 and operates movement stage 36 based on an instruction from controller 6. Thereby, movement stage 36 moves in the y-axis direction and the z-axis direction in the figure. That is, a movement direction of movement stage 36 is a biaxial direction perpendicular to measurement optical axis 23.

An emission end of measurement light 15 in measurement light inlet 9 is disposed to match a focal point of second mirror 35. Thereby, measurement light 15 becomes parallel light after being reflected by second mirror 35 and heads toward dichroic mirror 12.

An angle of measurement optical axis 23 from second mirror 35 toward dichroic mirror 12 changes due to a movement of movement stage 36. That is, the measurement light deflection unit is configured with movement stage 36 and second mirror 35. Thereby, the same effect as when measurement light deflection unit 17 which is a galvano mirror is used can be obtained.

SECOND MODIFICATION EXAMPLE

Figure 18:
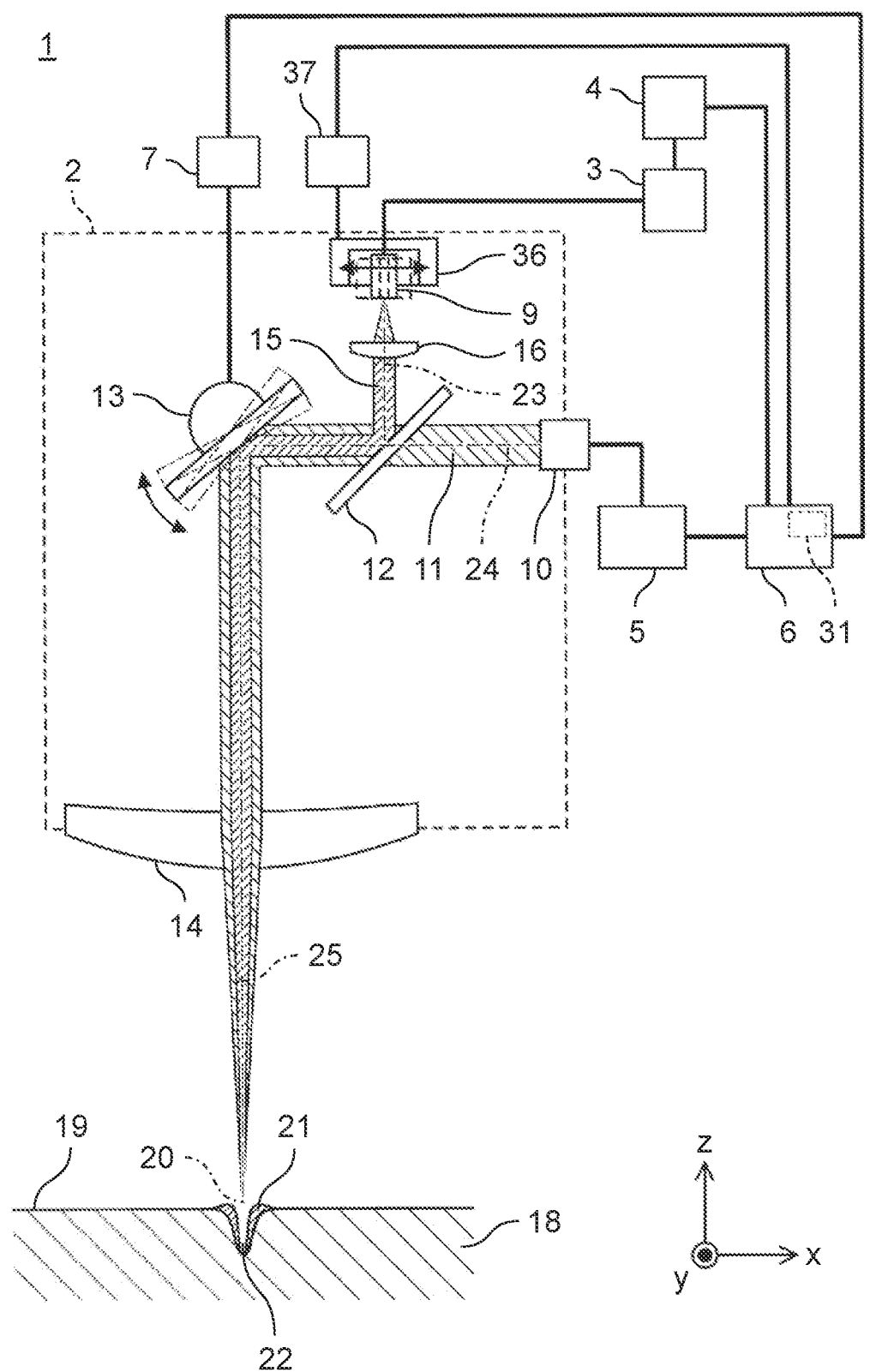
FIG. 18 is a view schematically illustrating a configuration of a laser processing apparatus according to a second modification example of the present disclosure.

FIG. 18 is a view schematically illustrating a configuration of laser processing apparatus 1 according to a second modification example of the present disclosure. Laser processing apparatus 1 illustrated in FIG. 18 includes collimating lens 16 illustrated in FIG. 1 and the like instead of second mirror 35 illustrated in FIG. 17. Further, laser processing apparatus 1 includes movement stage 36 and stage driver 37. Laser processing apparatus 1 illustrated in FIG. 18 does not include measurement light deflection unit 17 illustrated in FIG. 1 and the like.

Laser processing apparatus 1 according to the first modification example changes an angle of measurement optical axis 23 by using second mirror 35, whereas laser processing apparatus 1 according to the second modification example changes an angle of measurement optical axis 23 by using collimating lens 16.

Movement stage 36 is provided at measurement light inlet 9. Stage driver 37 is electrically connected to controller 6 and operates movement stage 36 based on an instruction from controller 6. Thereby, movement stage 36 moves in the y-axis direction and the x-axis direction. That is, a movement direction of movement stage 36 is a biaxial direction perpendicular to measurement optical axis 23.

An emission end of measurement light 15 in measurement light inlet 9 is disposed to match a focal point of collimating lens 16. Thereby, measurement light 15 becomes parallel light after transmitting through collimating lens 16, and heads toward dichroic mirror 12.

An angle of measurement optical axis 23 from collimating lens 16 toward dichroic mirror 12 changes due to a movement of movement stage 36. That is, a measurement light deflection unit is configured with movement stage 36 and collimating lens 16. Thereby, the same effect as when measurement light deflection unit 17 which is a galvano mirror is used as measurement light deflection unit can be obtained.

Second Exemplary Embodiment

Published Japanese Translation No. 2016-538134 of the PCT International Publication discloses a method of accurately measuring an entry depth of laser light in a workpiece by using measurement light. This measurement is performed by positioning an irradiation position of the laser light and an irradiation position of the measurement light on the workpiece. A laser processing apparatus to which the method is applied includes an optical member such as a mirror or a lens that guides the emitted laser light and the measurement light to the workpiece.

In the above-described laser processing apparatus, an output of the laser light is relatively high, and thus, a member that fixes the optical member is thermally deformed during a process performed by the laser light. When the irradiation position of laser light and the irradiation position of measurement light on the workpiece are changed under the state, the irradiation position of laser light and the irradiation position of measurement light on the workpiece deviate. As a result, the irradiation position of laser light cannot be measured accurately.

One aspect of the present disclosure is to solve the above-described problems, and an object of the present disclosure is to provide a laser processing apparatus that performs highly accurate positioning of an irradiation position of laser light and an irradiation position of measurement light in a workpiece.

In order to achieve the above object, a laser processing apparatus according to one aspect of the present disclosure includes a laser light emitting unit that emits laser light for processing a workpiece, a measurement light emitting unit that emits measurement light for measuring an irradiation position of the laser light on the workpiece, a beam position measurement unit that derives a relative position of an optical axis of the measurement light with respect to an optical axis of the laser light, and an optical path changing unit that changes an optical path of at least one of the laser light and the measurement light based on the relative position derived by the beam position measurement unit.

Further, in order to achieve the object, an optical adjustment method of a laser processing apparatus according to one aspect of the present disclosure is an optical adjustment method of a laser processing apparatus including a laser light emitting unit that emits laser light to a workpiece and a measurement light emitting unit that emits measurement light for measuring an irradiation position of laser light on the workpiece, and includes matching the irradiation position of the laser light and an irradiation position of the measurement light on the workpiece with each other, deriving a relative position of an optical axis of the measurement light with respect to an optical axis of the laser light applied to the workpiece, and changing an optical path of at least one of the laser light and the measurement light based on the derived relative position.

According to one aspect of the present disclosure, alignment between an irradiation position of laser light and an irradiation position of measurement light in a workpiece can be made accurately.

A laser processing apparatus may further include a mirror that reflects at least one of the laser light and the measurement light toward the workpiece, and a lens that is disposed between the mirror and the workpiece and converges the laser light and the measurement light on the workpiece. The beam position measurement unit may be disposed between the mirror and the lens.

The beam position measurement unit may include a reflector that reflects the laser light and the measurement light in a direction other than a direction toward the workpiece, and a light receptor that receives the laser light and the measurement light reflected by the reflector. The relative position may be derived based on the irradiation position of the laser light and the irradiation position of the measurement light in the light receptor.

A reflectance of the laser light of the reflector may be set to be less than or equal to a predetermined value.

The beam position measurement unit may include a plurality of reflectors.

The laser processing apparatus may further include a measurement unit that measures a depth of a processing point. The optical path changing unit may change an optical path of at least one of the laser light and the measurement light based on the depth of the processing point measured by the measurement unit so as to align the irradiation position of the laser light and the irradiation position of the measurement light on the workpiece with each other, and may change the optical path of at least one of the laser light and the measurement light based on the relative position derived by the beam position measurement unit when the irradiation position of the laser light and the irradiation position of the measurement light on the workpiece are aligned with each other.

The measurement unit may be an interferometer that measures a length of the optical path of the measurement light based on a waveform generated by an interference between light generated reflecting the measurement light from the workpiece and the measurement light.

Hereinafter, laser processing apparatus 201 according to a second exemplary embodiment of the present disclosure will be described with reference to the drawings. Description will be made by setting an upper side and a lower side in FIG. 19 as an upper portion and a lower portion of laser processing apparatus 201, respectively, a left side and a right side as a left portion and a right portion of laser processing apparatus 201, respectively, and a front side and a back side of a drawing sheet as a front portion and a rear portion of laser processing apparatus 201.

Laser processing apparatus 201 includes processing head 202, measurement unit 203, measurement processor 204, and laser oscillator 205. Measurement unit 203 is an example of a "measurement light emitting unit". Measurement processor 204 is an example of the "measurement unit". Laser oscillator 205 is an example of a "laser light emitting unit".

Processing light LB, which is laser light for processing workpiece W, is input to processing head 202. Processing head 202 causes input processing light LB to be applied to workpiece W disposed in a lower portion of processing head 202. Further, measurement light MB for measuring an irradiation position of processing light LB to workpiece W is input to processing head 202. Processing head 202 applies input measurement light MB to workpiece W.

Measurement unit 203 is, for example, an optical interferometer for optical coherence tomography (OCT) measurement. Measurement unit 203 emits laser light for OCT measurement as measurement light MB. A wavelength of measurement light MB is, for example, 1300 nm. Emitted measurement light MB is input to processing head 202 from measurement light inlet 206 and travels toward a lower portion.

Laser oscillator 205 oscillates processing light LB. Oscillated processing light LB is input to processing head 202 from processing light inlet 207 disposed in a left portion of measurement light inlet 206, and travels toward the lower portion. Processing light LB is, for example, a YAG laser or a fiber laser. A wavelength of processing light LB is, for example, 1064 nm, which is different from the wavelength of measurement light MB. First mirror 208 and first lens 209 are disposed in a lower portion of processing light inlet 207 in processing head 202. First lens 209 is an example of a "lens".

Processing light LB input from processing light inlet 207 transmits through first mirror 208. First mirror 208 is a dichroic mirror. First mirror 208 has characteristics of transmitting light having a wavelength of processing light LB therethrough and reflecting light having a wavelength of measurement light MB.

Further, processing light LB is converged by first lens 209 and collected at processing point WP on processing surface S of workpiece W. Thereby, processing point WP is laser-processed. At this time, workpiece W is melted at processing point WP, and molten pool M is formed thereat. Further, a molten metal evaporates from molten pool M, and keyhole H is formed by a pressure of steam generated by evaporation.

Measurement light MB input from measurement light inlet 206 is converted into parallel light by collimating lens 210 disposed in a lower portion of measurement light inlet 206. Further, measurement light MB is reflected by second mirror 211 disposed in a lower portion of collimating lens 210 toward first mirror 208 disposed on an optical path of processing light LB. Subsequently, measurement light MB is reflected by first mirror 208 toward processing point WP. First mirror 208 and second mirror 211 correspond to "mirrors".

Further, an angle adjusting mechanism (not illustrated) is disposed in second mirror 211. The angle adjusting mechanism changes an angle of second mirror 211. As the angle adjusting mechanism changes the angle of second mirror 211, second mirror 211 changes an optical path of measurement light MB. Second mirror 211 is an example of an "optical path changing unit".

Further, measurement light MB is converged by first lens 209 and travels toward processing point WP. By adjusting the angle of second mirror 211 as described below, measurement light MB is applied to a lowest point of keyhole H formed at processing point WP.

Subsequently, measurement light MB is reflected by the lowest point of keyhole H and reaches measurement unit 203 by traveling back along an optical path of measurement light MB. Measurement unit 203 generates an optical interference intensity signal based on an interference caused by a difference between an optical path length of reflected measurement light MB and an optical path length of emitted measurement light MB.

Measurement processor 204 measures a depth of keyhole H, that is, a penetration depth of processing point WP, based on the optical interference intensity signal generated by measurement unit 203. The penetration depth is a distance between a lowest point of keyhole H and processing surface S.

Further, laser processing apparatus 201 further includes beam position measurement unit 220 and control device 230.

Beam position measurement unit 220 derives a relative position of an optical axis of measurement light MB with respect to an optical axis of processing light LB. Beam position measurement unit 220 is disposed between first mirror 208 and first lens 209. Beam position measurement unit 220 includes reflector 221, beam terminator 222, second lens 223, and light receptor 224.

Reflector 221 and beam terminator 222 are configured to be movable between first position P1 (FIG. 19) that is out of optical paths of processing light LB and measurement light MB and second position P2 (FIG. 20) located on the optical paths of processing light LB and measurement light MB. Second lens 223 and light receptor 224 are disposed on a left portion of reflector 221.

Reflector 221 is a mirror that reflects processing light LB and measurement light MB toward second lens 223 when located at second position P2. Further, reflector 221 has characteristics of dividing light having a wavelength of processing light LB into reflection light and transmission light and of totally reflecting light having a wavelength of measurement light MB. A reflectance of processing light LB of reflector 221 is set to be a predetermined value. The predetermined value is a value at which an intensity of the reflection light of processing light LB applied to light receptor 224 is within a predetermined range. The predetermined range is a range in which a lower limit value is less than an intensity of measurement light MB and an upper limit value is greater than the intensity of measurement light MB, and is a range in which light receptor 224 can receive light.

For example, when a fiber laser having a rated output of 1 kW or more is selected as processing light LB, a minimum output of processing light LB is approximately 100 W. Meanwhile, when an OCT light source is used for measurement light MB, an output of measurement light MB is approximately several tens of mW. Thus, in order to reduce processing light LB of 100 W up to an output of the same order (several tens of mW) as measurement light MB of several tens of mW, a reflectance of processing light LB of reflector 221 is preferably set to 0.1% or less. Since measurement light MB does not need to be attenuated, the reflectance of measurement light MB of reflector 221 is preferably set to 90% or more.

Further, an output of processing light LB when processing light LB is applied to light receptor 224 is preferably set to an output of 10% or more of a rated output of laser oscillator 205. Particularly, in a case where laser oscillator 205 is a fiber laser, when an output of processing light LB is less than 10% of the rated output, an oscillation state of processing light LB is unstable, and this is because accuracy of an irradiation position LP of processing light LB in light receptor 224 is reduced.

Beam terminator 222 receives transmission light transmitted through reflector 221 and terminates the transmission light at second position P2.

Second lens 223 converges the reflection light and measurement light MB. The converged reflection light and measurement light MB travel toward light receptor 224.

Light receptor 224 receives the reflection light and measurement light MB. Light receptor 224 is a two-dimensional imaging element with sensitivity with respect to wavelengths of processing light LB and measurement light MB. Light receptor 224 is, for example, a commercially available industrial camera including an element such as a charge-coupled device (CCD), a complementary metal oxide semiconductor (CMOS), or indium gallium arsenide (InGaAs), or a two-dimensional beam profiler.

A shape of second lens 223 and a distance between light receptor 224 and second lens 223 are set such that focal points of the converged reflection light and measurement light MB are located on a light receiving surface that receives the reflection light and measurement light MB in light receptor 224.

Control device 230 is a computer that performs an overall control of laser processing apparatus 201. Control device 230 controls an angle adjusting mechanism and adjusts an angle of second mirror 211.

Figure 19:
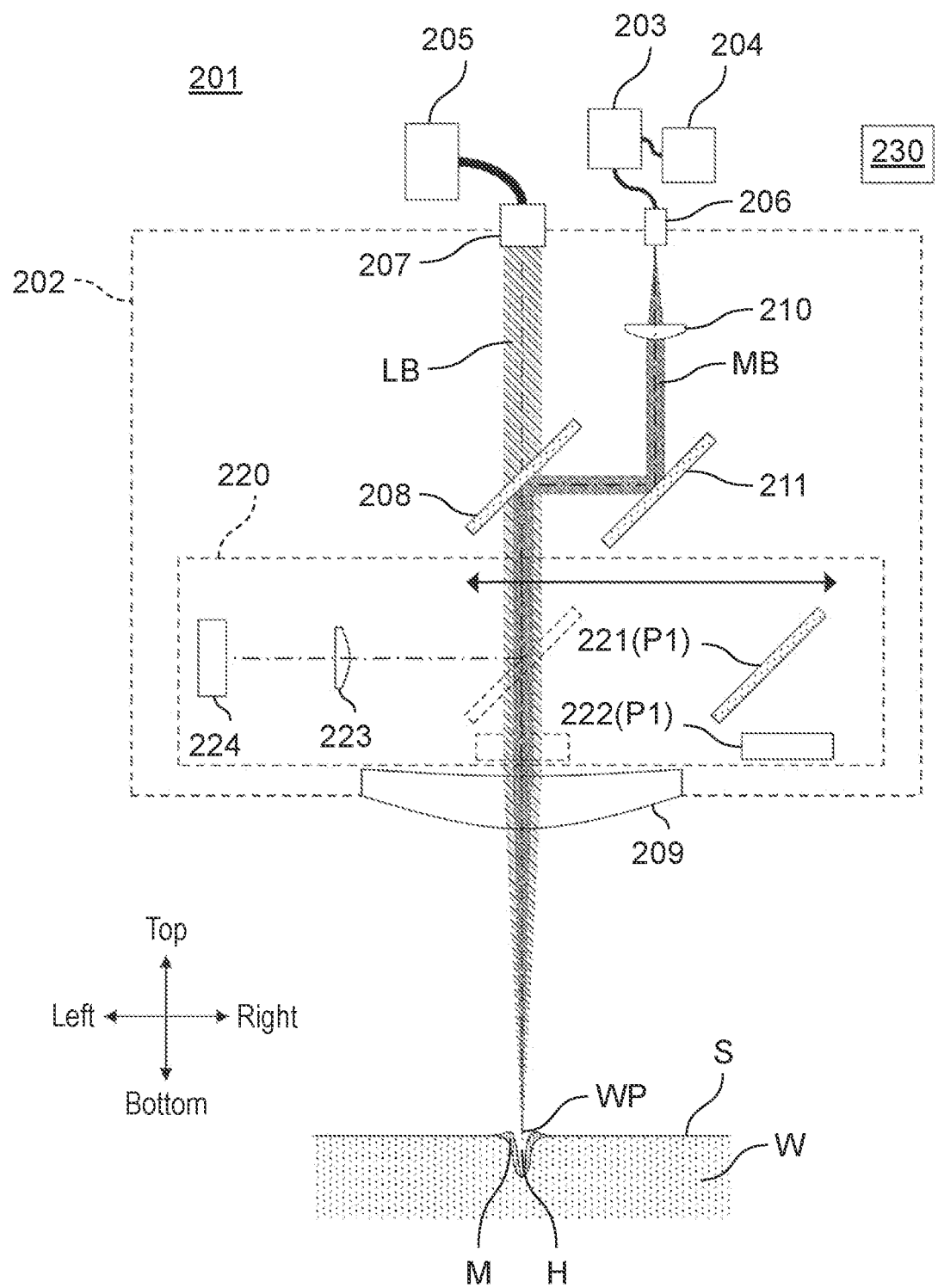
FIG. 19 is a schematic view illustrating a laser processing apparatus according to a second exemplary embodiment of the present disclosure.

Next, an operation of laser processing apparatus 201 described above and a program executed by control device 230 will be described with reference to a flowchart of FIG. 21. The program executes an optical adjustment for aligning an irradiation position of processing light LB and an irradiation position of measurement light MB on workpiece W with each other. This will be described from a state where reflector 221 and beam terminator 222 are located at first position P1 (FIG. 19).

Control device 230 determines in S100 whether or not the optical adjustment this time is a first optical adjustment. When relative position R, which is irradiation position MP of measurement light MB with respect to irradiation position LP of processing light LB in light receptor 224 to be described below, is not stored in control device 230, the optical adjustment this time is the first optical adjustment. In this case (YES in S100), control device 230 aligns the irradiation position of processing light LB and the irradiation position of measurement light MB on workpiece W with each other in S102.

Specifically, control device 230 irradiates a processing surface of a workpiece (not illustrated) for adjustment prepared for optical adjustment with processing light LB to form a microhole. Subsequently, control device 230 scans the microhole with measurement light MB while adjusting an angle of second mirror 211 to change an optical path of measurement light MB, and derives a position where a lowest point of the microhole, that is, an optical path length of measurement light MB is the longest from a measurement result of measurement processor 204. The lowest point of the microhole corresponds to an irradiation position of processing light LB. Control device 230 adjusts an angle of second mirror 211 and aligns an irradiation position of measurement light MB to the lowest point of the microhole, thereby aligning the irradiation position of processing light LB and the irradiation position of measurement light MB in a workpiece for adjustment with each other. Thereby, the irradiation position of processing light LB and the irradiation position of measurement light MB in actual workpiece W are aligned with each other.

Figure 20:
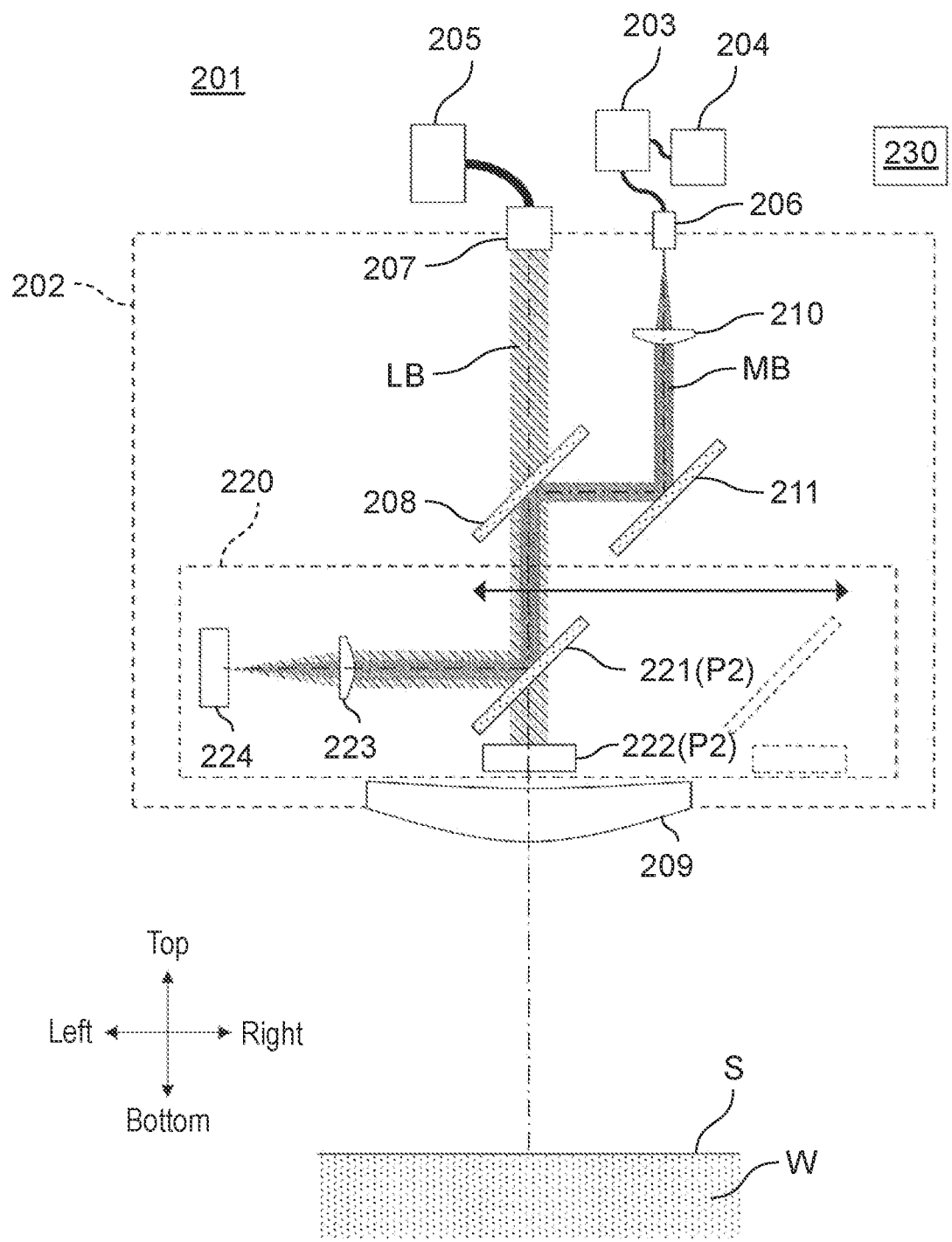
FIG. 20 is a view illustrating a state when the beam position measurement unit derives a relative position of an optical axis of measurement light with respect to an optical axis of processing light.

Subsequently, control device 230 moves reflector 221 and beam terminator 222 to second position P2 in S104 (FIG. 20). Transmission light of processing light LB is terminated by beam terminator 222. Meanwhile, the reflection light of processing light LB and measurement light MB are reflected by reflector 221, converged by second lens 223, and applied to light receptor 224.

Figure 22:
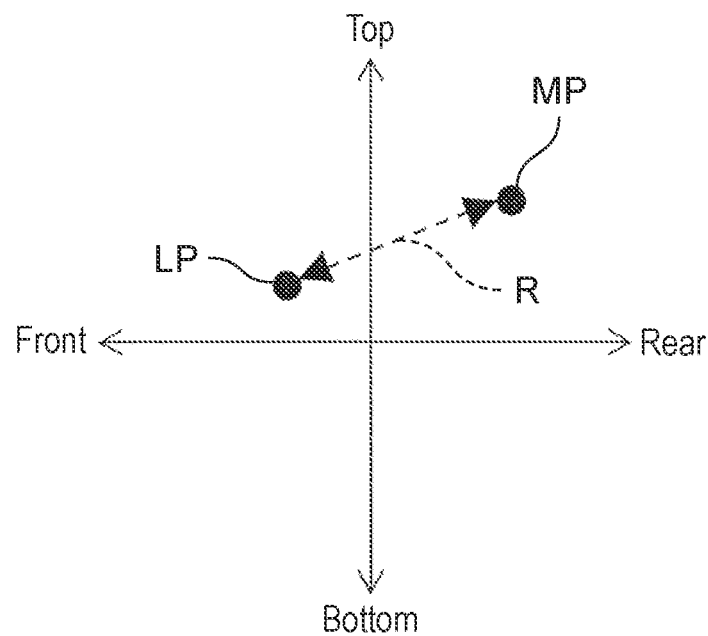
FIG. 22 is a diagram illustrating an irradiation position of the processing light and an irradiation position of the measurement light of an imaging element during a first optical adjustment.

At this time, although the irradiation position of processing light LB and the irradiation position of measurement light MB on workpiece W are aligned with each other, irradiation position LP of the reflection light and irradiation position MP of measurement light MB in light receptor 224 are not aligned with each other (FIG. 22). This is because, even when the irradiation position of processing light LB and the irradiation position of measurement light MB on workpiece W are aligned with each other, wavelengths of processing light LB and measurement light MB are different from each other as described above, and thereby, the optical axis of processing light LB and the optical axis of measurement light MB are not aligned with each other due to an influence of a chromatic aberration of first lens 209. Further, the reflection light which is processing light LB applied to light receptor 224, and measurement light MB are converged by second lens 223 having a different chromatic aberration from first lens 209. For this reason, irradiation position LP of the reflection light in light receptor 224 and irradiation position MP of measurement light MB are not aligned with each other.

However, at this time, relative position R (that is, a deviation between irradiation position LP of the reflection light and irradiation position MP of measurement light MB) which is irradiation position MP of measurement light MB with respect to irradiation position LP of the reflection light of processing light LB in light receptor 224 is relative position R in light receptor 224 when the irradiation position of processing light LB and the irradiation position of measurement light MB on workpiece W are aligned with each other.

Relative position R is measured by light receptor 224. Relative position R in light receptor 224 has a correlation with a relative position of an optical axis of measurement light MB with respect to an optical axis of processing light LB. That is, light receptor 224 indirectly derives the relative position of the optical axis of measurement light MB with respect to the optical axis of processing light LB. A measurement result of light receptor 224 is output to control device 230.

In S106, control device 230 derives relative position R which is irradiation position MP of measurement light MB with respect to irradiation position LP of reflection light in light receptor 224 at this time, from the measurement result of light receptor 224 as relative position R in light receptor 224 when the irradiation position of processing light LB and the irradiation position of measurement light MB on workpiece W are aligned with each other, and stores the derived relative position.

Subsequently, control device 230 ends the program by moving reflector 221 and beam terminator 222 to first position P1 in S108. Thereafter, workpiece W is processed. Control device 230 executes the program at a predetermined timing (for example, every predetermined time (10 seconds)) in order to perform the optical adjustment during processing.

When control device 230 starts the program again, control device 230 determines in S100 whether or not the optical adjustment this time is a first optical adjustment. When above-described relative position R is stored in control device 230, the optical adjustment this time is second and subsequent optical adjustments. In this case (NO in S100), control device 230 moves reflector 221 and beam terminator 222 to second position P2 in S110 (FIG. 20). Thereby, as described above, processing light LB and measurement light MB are reflected by reflector 221, converged by second lens 223, and applied to light receptor 224.

Figure 23:
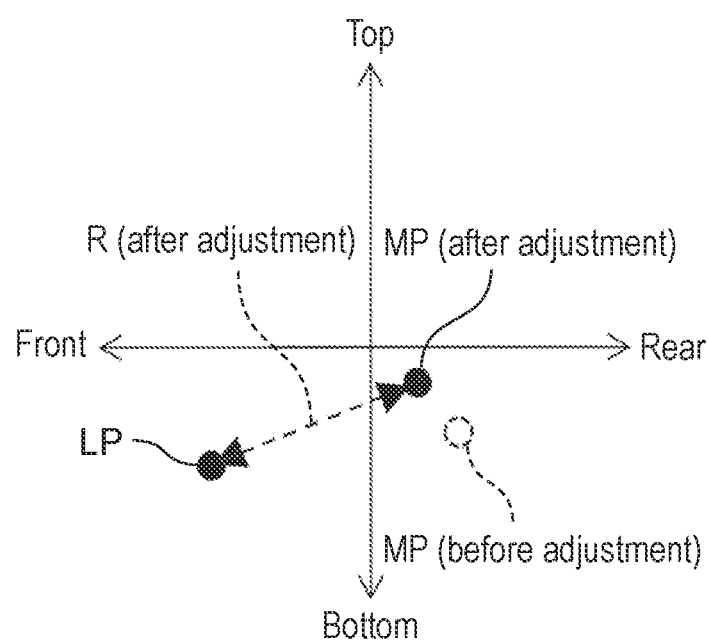
FIG. 23 is a diagram illustrating an irradiation position of the processing light and an irradiation position of the measurement light of the imaging element during second and subsequent optical adjustments.

At this time, irradiation position LP of the reflection light of processing light LB and irradiation position MP (irradiation position MP of unadjusted measurement light MB) of measurement light MB in light receptor 224 are displaced from a time of the first optical adjustment (FIG. 23). That is, relative position R in light receptor 224 is different from relative position R derived by control device 230.

This is because, since processing light LB has a relatively high output, a temperature of a configuration member of processing head 202 and furthermore a fixing member for fixing the configuration member increases, and thereby, a thermal deformation of the fixing member and furthermore a displacement of the configuration member occurs, and an optical path of processing light LB and an optical path of measurement light MB change. At this time, when reflector 221 and beam terminator 222 are located at first position P1, an incident angle of processing light LB and measurement light MB on first lens 209, and furthermore, an irradiation position of processing light LB and an irradiation position of measurement light MB on workpiece W are also displaced.

Subsequently, control device 230 adjusts relative position R in light receptor 224 based on the derived relative position R in S112. Specifically, control device 230 adjusts an angle of second mirror 211 such that relative position R in light receptor 224 becomes derived relative position R, and changes an optical path of measurement light MB, thereby displacing irradiation position MP of measurement light MB in light receptor 224. Thereby, adjusted relative position R, which is irradiation position MP of adjusted measurement light MB with respect to irradiation position LP of the reflection light in light receptor 224, matches derived relative position R (FIG. 23).

Further, control device 230 moves reflector 221 and beam terminator 222 to first position P1 in S108. Thereby, workpiece W is irradiated with processing light LB and measurement light MB. At this time, since relative position R in light receptor 224 is adjusted, the irradiation position of processing light LB and the irradiation position of measurement light MB on workpiece W are aligned with each other.

As such, in the second and subsequent optical adjustments, the irradiation position of processing light LB and the irradiation position of measurement light MB on workpiece W can be aligned with each other without scanning a microhole by measurement light MB, control device 230 can easily perform an optical adjustment. Further, as compared with a case where the irradiation position of measurement light MB corresponding to the lowest point of the microhole is derived by scanning measurement light MB, in a case where irradiation position MP of measurement light MB with respect to irradiation position LP of processing light LB in light receptor 224 is derived, control device 230 can accurately derive the irradiation position of measurement light MB with respect to the irradiation position of processing light LB. Thus, control device 230 can accurately align the irradiation position of processing light LB and the irradiation position of measurement light MB on workpiece W with each other. Further, a workpiece for adjustment need not be prepared in the second optical adjustment.

According to the above-described exemplary embodiment, laser processing apparatus 201 includes laser oscillator 205 that emits processing light LB to workpiece W, measurement unit 203 that emits measurement light MB for measuring an irradiation position of processing light LB on workpiece W, beam position measurement unit 220 that derives a relative position of an optical axis of measurement light MB with respect to an optical axis of processing light LB, and second mirror 211 that changes the optical path of measurement light MB based on relative position R derived by beam position measurement unit 220.

According to this, an irradiation position of processing light LB and an irradiation position of measurement light MB on workpiece W can be easily and highly accurately aligned with each other.

Further, laser processing apparatus 201 further includes first mirror 208 and second mirror 211 which reflect measurement light MB toward an irradiation position of processing light LB on workpiece W, and first lens 209 which is disposed between workpiece W and first and second mirrors 208 and 211 and converges processing light LB and measurement light MB on workpiece W. Beam position measurement unit 220 is disposed between first and second mirrors 208 and 211 and first lens 209.

According to this, beam position measurement unit 220 includes an influence of a change in an optical path of measurement light MB caused by displacements of first mirror 208 and second mirror 211, and a relative position of an optical axis of measurement light MB with respect to an optical axis of processing light LB can be derived.

Further, beam position measurement unit 220 includes reflector 221 that reflects processing light LB and measurement light MB in a direction other than a direction toward workpiece W, and light receptor 224 that receives processing light LB and measurement light MB reflected by reflector 221. Relative position R is derived based on irradiation position LP of processing light LB and irradiation position MP of measurement light MB in light receptor 224.

According to this, alignment between an irradiation position of processing light LB and an irradiation position of measurement light MB on workpiece W can be made more easily and more accurately.

Further, a reflectance of processing light LB of reflector 221 is set to be less than or equal to a predetermined value.

According to this, since an intensity of reflection light and an intensity of measurement light MB applied to light receptor 224 can be within a predetermined range, irradiation position MP of measurement light MB with respect to irradiation position LP of reflection light can be easily derived by one light receptor 224 without using a plurality of light receptors 224. This is because, when one of the intensity of the reflection light and the intensity of measurement light MB is out of the predetermined range, light receptor 224 corresponding to each intensity is required.

Further, laser processing apparatus 201 further includes measurement processor 204 for measuring a depth of processing point WP. Second mirror 211 changes an optical path of measurement light MB based on the depth of processing point WP measured by measurement processor 204 so as to align an irradiation position of processing light LB and an irradiation position of measurement light MB on workpiece W with each other, and changes the optical path of measurement light MB based on relative position R derived by beam position measurement unit 220 when the irradiation position of processing light LB and the irradiation position of measurement light MB on workpiece W are aligned with each other.

According to this, alignment between an irradiation position of processing light LB and an irradiation position of measurement light MB on workpiece W can be made more reliably and more accurately.

Further, measurement processor 204 is an interferometer that measures a length of an optical path of measurement light MB based on a waveform generated by an interference between light generated by reflecting measurement light MB from workpiece W and measurement light MB.

According to this, laser processing apparatus 201 can accurately derive an irradiation position of measurement light MB on workpiece W.

The present disclosure is not limited to the exemplary embodiments described so far. As long as the gist of the present disclosure is not deviated, the present disclosure also includes a form in which various modifications are applied to the present exemplary embodiments and a form constructed by combining components in different exemplary embodiments.

Figure 21:
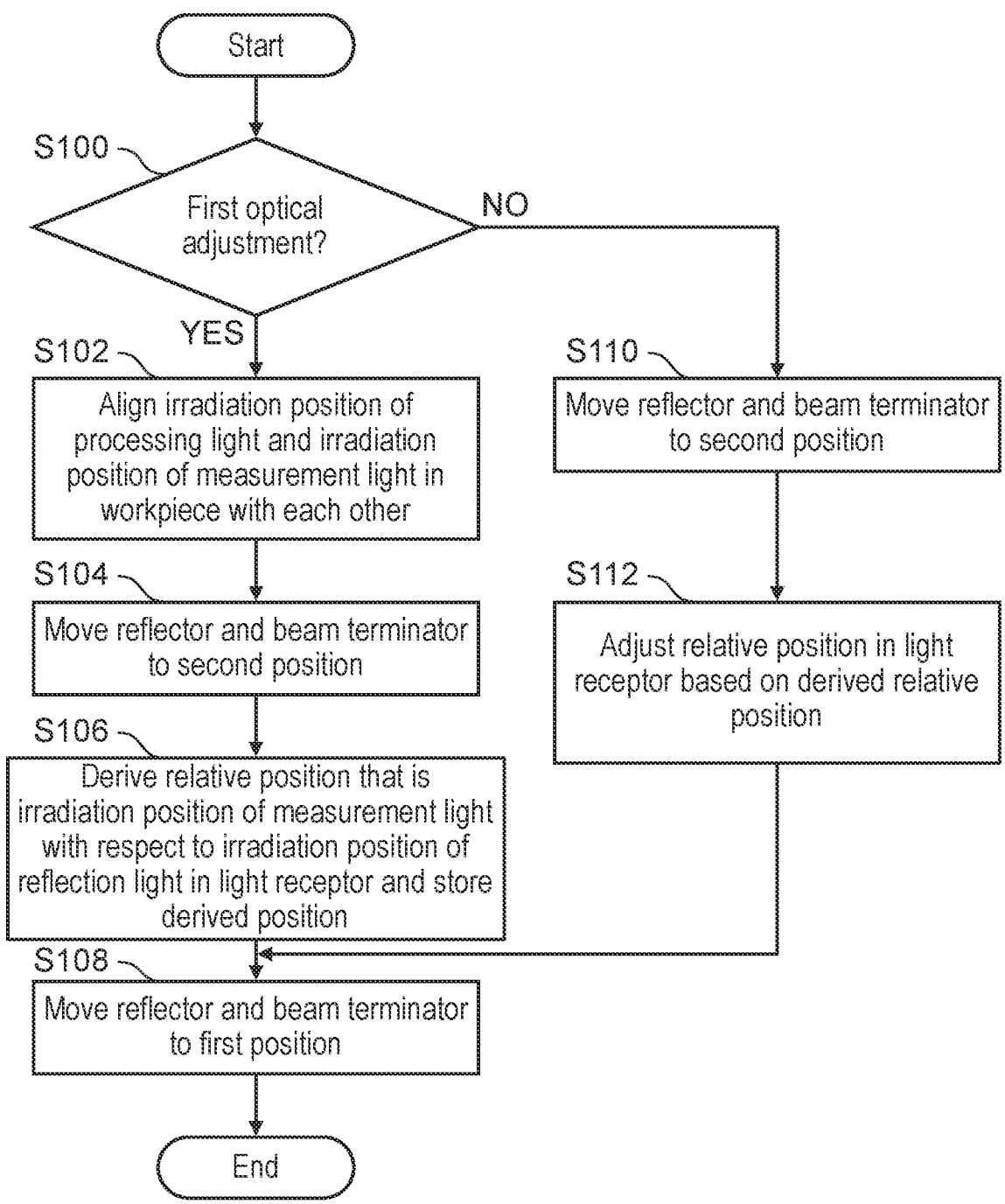
FIG. 21 is a flowchart of a program executed by a control device.

For example, although the flowchart illustrated in FIG. 21 is described as a program executed by control device 230, a user of laser processing apparatus 201 may perform each step of the flowchart of FIG. 21. In this case, control device 230 includes a display (not illustrated) that displays relative position R in light receptor 224, and an operator (not illustrated) for a user to perform switching of positions of reflector 221 and beam terminator 222 and adjustment of an angle of second mirror 211.

Further, relative position R in light receptor 224 is adjusted by displacing irradiation position MP of measurement light MB in light receptor 224, but instead, may be adjusted by displacing irradiation position LP of reflection light in light receptor 224. In this case, for example, an angle adjusting mechanism may be disposed at processing light inlet 207, and control device 230 may control the angle adjusting mechanism to change an optical path of processing light LB. Angle adjusting mechanisms are disposed in both second mirror 211 and processing light inlet 207, and control device 230 may controls both angle adjusting mechanisms to change an optical path of processing light LB and an optical path of measurement light MB and to adjust relative position R in light receptor 224. Further, the angle adjusting mechanism disposed in second mirror 211 may be disposed in measurement light inlet 206. Further, each angle adjusting mechanism may be controlled by control device 230 or may be a manual type.

Figure 24:
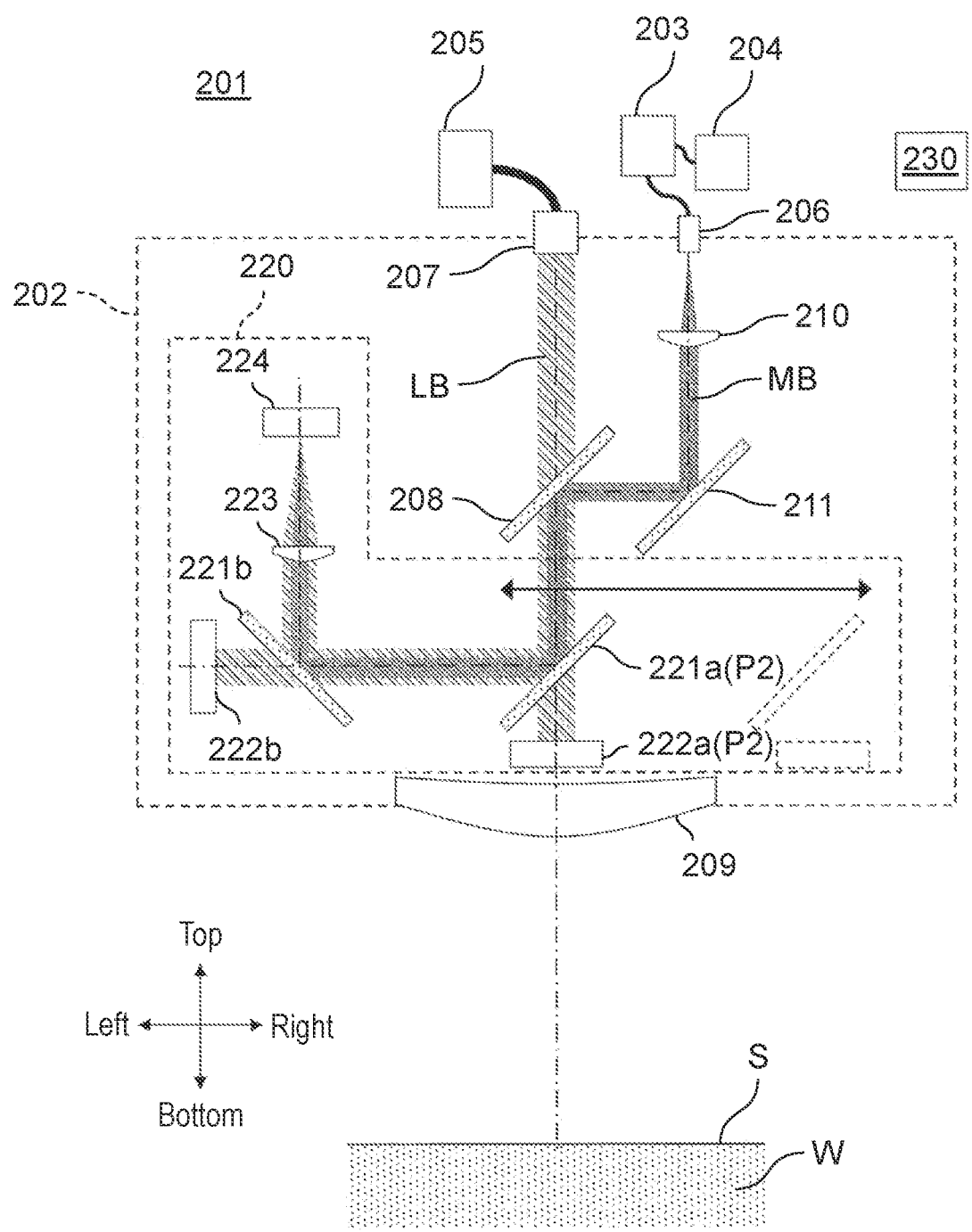
FIG. 24 is a view illustrating a state where the second and subsequent optical adjustments are performed by a laser processing apparatus according to a modification example of the second exemplary embodiment of the present disclosure.

Further, in the above-described exemplary embodiments, beam position measurement unit 220 includes one reflector 221 but may include a plurality of reflectors 221. In this case, as illustrated in FIG. 24, first reflector 221a that moves between first position P1 and second position P2, and second reflector 221b that reflects the reflection light and measurement light MB reflected by first reflector 221a toward second lens 223 and light receptor 224 may be provided. Further, in this case, a plurality of beam terminators 222 are provided so as to correspond to the number of reflectors 221. Transmission light transmitted from first reflector 221a is terminated by first beam terminator 222a. The transmission light transmitted through second reflector 221b is terminated by second beam terminator 222b. As such, by providing the plurality of reflectors 221, even when an intensity of processing light LB and an intensity of measurement light MB are relatively great, an intensity of reflection light and the intensity of measurement light MB can be adjusted within a predetermined range.

Further, reflector 221 uses a mirror that separates processing light LB into the transmission light and the reflection light, but in addition to this, a mirror that totally reflects processing light LB may be provided. In this case, beam terminator 222 may not be provided.

Further, in the above-described exemplary embodiments, processing light LB and measurement light MB are reflected by reflector 221 and then transmit through second lens 223 to be applied to light receptor 224. Instead thereof, processing light LB and measurement light MB may transmit through second lens 223 and then reflected by reflector 221 to be applied to light receptor 224. In this case, second lens 223 is movably disposed. According to this, even when second lens 223 having a long focal length is selected, optical paths of the reflection light and measurement light MB are bent, and thus, a size of beam position measurement unit 220 can be prevented from increasing.

Further, beam position measurement unit 220 may be configured with two light receptors (not illustrated). In a second optical adjustment, the first light receptor is disposed between processing light inlet 207 and first mirror 208, and the first light receptor is irradiated with processing light LB. In the second optical adjustment, the second light receptor is disposed between collimating lens 210 and second mirror 211, and the second light receptor is irradiated with measurement light MB. The center of processing light LB applied to the first light receptor corresponds to an optical axis of the processing light. Further, the center of the measurement light applied to the second light receptor corresponds to an optical axis of measurement light MB. Thus, control device 230 can directly derive a relative position of the optical axis of measurement light MB with respect to an optical axis of processing light LB based on a central position of processing light LB applied to the first light receptor and a central position of measurement light MB applied to the second light receptor. Further, in this case, control device 230 controls an angle adjusting mechanism disposed in measurement light inlet 206 to adjust an angle of measurement light inlet 206 and change an optical path of measurement light MB.

Further, in the above-described exemplary embodiments, reflector 221 is formed in a plate shape but may have a shape other than the plate shape as long as a portion that reflects processing light LB and measurement light MB is flat.

Further, beam position measurement unit 220 includes beam terminator 222 but may include beam terminator 222 when an intensity of transmission light is relatively small instead thereof.

Further, although reflector 221 totally reflects measurement light MB, a reflectance may be set to divide measurement light MB into the reflection light and the transmission light instead thereof. In this case, since relative position R in light receptor 224 can be derived in real time while processing workpiece W, an irradiation position of processing light LB and an irradiation position of measurement light MB on workpiece W can be aligned with each other in real time while processing workpiece W.

When laser light (for example, a single mode fiber laser) having a beam diameter of 50 µm or less at processing point WP is used, accuracy of adjustment of the irradiation position of processing light LB and the irradiation position of measurement light MB is required to be 10 µm or less, but an optical adjustment of laser processing apparatus 201 described above can meet the required accuracy.

Figure 25:
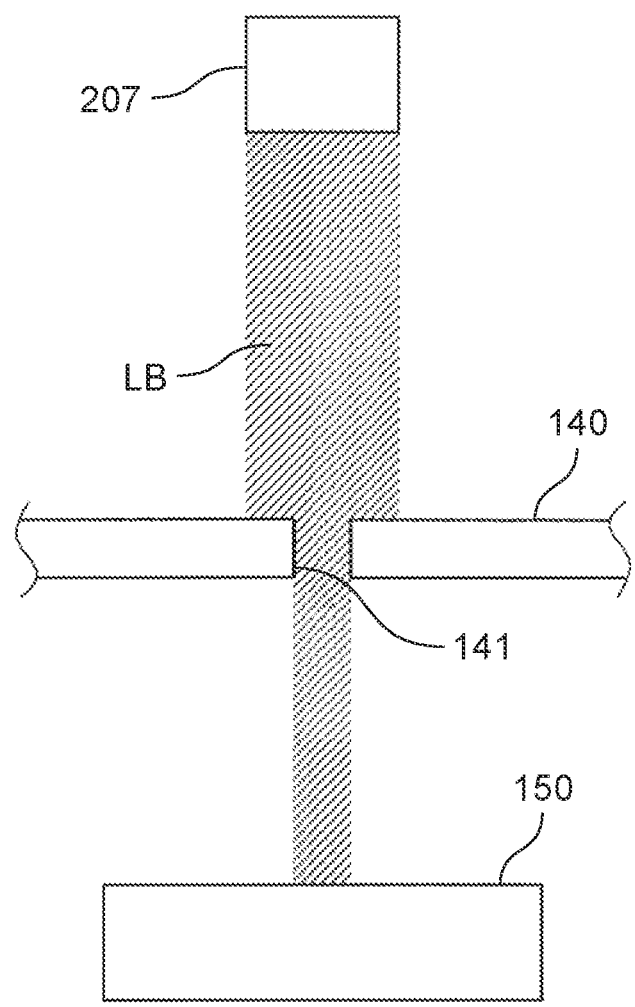
FIG. 25 is a view illustrating a state where first and subsequent optical adjustments are performed by the laser processing apparatus according to a modification example of the second exemplary embodiment of the present disclosure.

Further, a first optical adjustment is performed by scanning a microhole formed at processing point WP with measurement light MB as described above, but instead thereof, as illustrated in FIG. 25, plate member 140 in which slit 141 is formed and power meter 150 that detects an intensity of processing light LB may be used.

In this case, control device 230 changes an optical path of processing light LB so as to scan slit 141 by using processing light LB, and a change in intensity of processing light LB is detected by power meter 150. Control device 230 adjusts a relative position of the optical path of processing light LB with respect to slit 141 based on the detected change in intensity of processing light LB. Likewise, control device 230 adjusts a relative position of an optical path of measurement light MB with respect to slit 141 to align an irradiation position of processing light LB and an irradiation position of measurement light MB on workpiece W with each other.

Further, there are two mirrors of first mirror 208 and second mirror 211 that reflect measurement light MB toward the irradiation position of processing light LB on workpiece W, but it is needless to say that the number of mirrors is not limited thereto. For example, the number of mirrors may be two or more. Further, disposition of measurement light inlet 206 may be changed, and the number of mirrors is one. In this case, for example, measurement light inlet 206 and collimating lens 210 may be disposed in a right portion of first mirror 208, and the mirror may be only first mirror 208. In this case, an angle adjusting mechanism may be disposed on first mirror 208.

Further, first mirror 208 has characteristics of transmitting processing light LB therethrough and reflecting measurement light MB but may have characteristics of transmitting measurement light MB therethrough and reflecting processing light LB instead thereof. In this case, for example, processing light LB is incident on first mirror 208 from the right portion, and measurement light MB is incident on first mirror 208 from an upper portion. Further, first mirror 208 may have characteristics of reflecting both processing light LB and measurement light MB. In this case, for example, processing light LB and measurement light MB are incident on first mirror 208 from the right portion. As such, the first mirror reflects at least one of processing light LB and measurement light MB toward workpiece W.

The laser processing apparatus and the laser processing method according to the present disclosure are useful for laser processing of, for example, automobiles and electronic components.

What is claimed is:

1. A laser processing apparatus comprising:
   a laser oscillator configured to oscillate processing laser light to be incident on a processing point on a processing surface of a workpiece;
   a measurement light inlet configured to introduce measurement light to be incident on the processing point;
   a coupling mirror configured to deflect or transmit the processing laser light and measurement light toward the processing point;
   a measurement light deflection unit installed between the measurement light inlet and the coupling mirror and configured to change an incident angle of the measurement light on the coupling mirror by changing an optical axis direction of the measurement light;
   a lens configured to concentrate the processing laser light and the measurement light on the processing point;
   a controller configured to control the laser oscillator and the measurement light deflection unit;
   a measurement processor configured to measure a depth of a keyhole generated at the processing point by the processing laser light by using an optical interference signal based on an interference generated by an optical path difference between the measurement light reflected at the processing point and reference light; and
   a beam position measurement unit configured to measure positions of the processing laser light and the measurement light,
   wherein the measurement light deflection unit includes:
   (i) a parabolic mirror or a micro electro mechanical systems (MEMS) mirror fixed between the measurement light inlet and the coupling mirror and a movement stage configured to move the measurement light inlet, or (ii) a movement stage configured to move the measurement light inlet and a collimating lens.

2. A laser processing apparatus comprising:
   a laser oscillator configured to oscillate processing laser light to be incident on a processing point on a processing surface of a workpiece;
   a coupling mirror configured to deflect or transmit the processing laser light and measurement light to be incident on the processing point toward the processing point;
   a measurement light deflection unit configured to change an incident angle of the measurement light on the coupling mirror;
   a lens configured to concentrate the processing laser light and the measurement light on the processing point;
   a controller configured to control the laser oscillator and the measurement light deflection unit;
   a measurement processor configured to measure a depth of a keyhole generated at the processing point by the processing laser light by using an optical interference signal based on an interference generated by an optical path difference between the measurement light reflected at the processing point and reference light;
   a beam position measurement unit configured to measure positions of the processing laser light and the measurement light; and
   a first mirror configured to change a travel direction of the processing laser light and the measurement light,
   wherein the controller further controls the first mirror based on processing data.

3. The laser processing apparatus of claim 2, wherein
   the processing data includes a first instruction value indicating an operation amount of the first mirror and a second instruction value indicating an operation amount of the measurement light deflection unit,
   the beam position measurement unit includes
      a position measurement mirror that reflects the processing laser light and the measurement light each passing through the lens, and
      a two-dimensional imaging element that measures the positions of the processing laser light and the measurement light each reflected by the position measurement mirror, and
   the controller sets a target position on the processing surface, sets the first instruction value to cause the processing laser light to be incident on the target position, and calculates the second instruction value based on the positions measured by the two-dimensional imaging element.

4. The laser processing apparatus of claim 3, wherein
   the position measurement mirror is set to have a reflectance at a wavelength of the processing laser light, the reflectance causing power allowing the processing laser light to enter the two-dimensional imaging element, and
   the two-dimensional imaging element is located at a position where an optical path length from the lens to the two-dimensional imaging element matches an optical path length from the lens to the processing point.

5. The laser processing apparatus of claim 3, wherein
   the position measurement mirror is composed of a plurality of mirrors.

6. The laser processing apparatus of claim 3, wherein
in the position measurement mirror, a reflectance of a wavelength of the processing laser light is 0.1% or less.

7. The laser processing apparatus of claim 3, wherein
the controller sets a grid shape pattern on the processing surface and sets a grid point of the grid shape pattern to the target position.

8. A laser processing apparatus comprising:
a laser oscillator configured to oscillate processing laser light to be incident on a processing point on a processing surface of a workpiece;
a coupling mirror configured to deflect or transmit the processing laser light and measurement light to be incident on the processing point toward the processing point;
a measurement light deflection unit configured to change an incident angle of the measurement light on the coupling mirror;
a lens configured to concentrate the processing laser light and the measurement light on the processing point;
a controller configured to control the laser oscillator and the measurement light deflection unit;
a measurement processor configured to measure a depth of a keyhole generated at the processing point by the processing laser light by using an optical interference signal based on an interference generated by an optical path difference between the measurement light reflected at the processing point and reference light; and
a beam position measurement unit configured to measure positions of the processing laser light and the measurement light, wherein:
the beam position measurement unit derives a relative position of an optical axis of the measurement light with respect to an optical axis of the processing laser light, and
the controller controls the coupling mirror having an angle adjusting function or the measurement light deflection unit based on the relative position derived by the beam position measurement unit.

9. The laser processing apparatus of claim 8, wherein
the lens is disposed between the coupling mirror and the workpiece, and the beam position measurement unit is disposed between the coupling mirror and the lens.

10. The laser processing apparatus of claim 8, wherein
the beam position measurement unit includes
a reflector that reflects the processing laser light and the measurement light in a direction other than a direction toward the workpiece, and
a light receptor that receives the processing laser light and the measurement light each reflected by the reflector, and
the beam position measurement unit derives the relative position based on an irradiation position of the processing laser light and an irradiation position of the measurement light in the light receptor.

11. The laser processing apparatus of claim 10, wherein
a reflectance of the processing laser light of the reflector is set to be less than or equal to a predetermined value.

12. The laser processing apparatus of claim 10, wherein
the beam position measurement unit includes a plurality of reflectors each being the reflector.

13. The laser processing apparatus of claim 8, wherein
the controller controls the coupling mirror or the measurement light deflection unit such that an optical path of at least one of the processing laser light and the measurement light is changed to align an irradiation position of the processing laser light and an irradiation position of the measurement light on the workpiece with each other, and
such that an optical path of at least one of the processing laser light and the measurement light is changed based on the relative position derived by the beam position measurement unit when the irradiation position of the processing laser light and the irradiation position of the measurement light on the workpiece are aligned with each other.

14. The laser processing apparatus of claim 13, wherein
the measurement processor is an interferometer that measures a length of an optical path of the measurement light based on a waveform generated by the interference.

15. The laser processing apparatus of claim 8, wherein the controller
causes the coupling mirror or the measurement light deflection unit to align an irradiation position of the processing laser light and an irradiation position of the measurement light on the workpiece with each other,
stores the relative position derived by the beam position measurement unit when the irradiation position of the processing laser light and the irradiation position of the measurement light on the workpiece are aligned with each other, and
controls the coupling mirror or the measurement light deflection unit such that a relative position between the irradiation position of the processing laser light and the irradiation position of the measurement light on the beam position measurement unit is aligned with the stored relative position.

* * * * *